US011138901B1

(12) United States Patent
Angel et al.

(10) Patent No.: US 11,138,901 B1
(45) Date of Patent: Oct. 5, 2021

(54) ITEM RECOGNITION AND ANALYSIS

(71) Applicant: Amazon Technologies, Inc., Seattle, WA (US)

(72) Inventors: Justin-Josef Angel, San Francisco, CA (US); Animesh Mishra, Cambridge (GB); Robert Steven Murdock, Fairfax, CA (US); Eric Alan Breitbard, Oakland, CA (US); Cressida Magdalen Harding, Cambridge (GB); Vlastimil Pis, Cambridge (GB); Milena Sadee, San Francisco, CA (US); Gordon Lee, Cambridge (GB); Christopher Mark Stevens Adcock, Cambridge (GB)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 15/636,531

(22) Filed: Jun. 28, 2017

(51) Int. Cl.
*G09B 19/00* (2006.01)
*G06T 7/62* (2017.01)
*G06K 9/00* (2006.01)
*G06K 9/62* (2006.01)
*G09B 5/02* (2006.01)
*G01G 19/414* (2006.01)

(52) U.S. Cl.
CPC ..... *G09B 19/0092* (2013.01); *G01G 19/4146* (2013.01); *G06K 9/00624* (2013.01); *G06K 9/6201* (2013.01); *G06T 7/62* (2017.01); *G09B 5/02* (2013.01); *G06K 2209/17* (2013.01)

(58) Field of Classification Search
CPC ........ G09B 19/0092; G09B 5/02; G06T 7/62; G01G 19/4146; G06K 9/00624; G06K 9/6201; G06K 2209/17
See application file for complete search history.

(56) References Cited

U.S. PATENT DOCUMENTS

| 7,505,621 | B1 |   | 3/2009 | Agrawal et al. |
|---|---|---|---|---|
| 8,639,036 | B1 | * | 1/2014 | Singer ................. G06K 9/6217 382/141 |
| 8,690,578 | B1 | * | 4/2014 | Nusbaum ............... G09B 19/00 434/127 |
| 8,984,136 | B1 |   | 3/2015 | Francis, Jr. et al. |
| 8,990,213 | B1 | * | 3/2015 | Yalamanchi ........ G06F 12/0646 707/740 |
| 9,160,993 | B1 | * | 10/2015 | Lish ................... H04N 5/23229 |
| 9,569,700 | B1 |   | 2/2017 | Santos et al. |
| 9,702,858 | B1 | * | 7/2017 | Minvielle .............. G01N 33/02 |

(Continued)

OTHER PUBLICATIONS

Office action for U.S. Appl. No. 15/670,225, dated Mar. 11, 2019, Angel, "Image-Based Item Identification", 31 pages.

(Continued)

*Primary Examiner* — Malina D. Blaise
(74) *Attorney, Agent, or Firm* — Lee & Hayes, P.C.

(57) ABSTRACT

Systems and methods for item recognition and analysis are disclosed. One or more items are recognized utilizing, for example, image data, and a quantity of the one or more items is determined based at least in part on data representing a weight of the items. Nutritional information associated with the items is determined and utilized for one or more purposes, including, for example, nutrition tracking, meal apportionment, label generation, and recipe creation and modification.

20 Claims, 13 Drawing Sheets

(56) References Cited

U.S. PATENT DOCUMENTS

| | | |
|---|---|---|
| 9,760,778 B1 | 9/2017 | Wakim |
| 10,025,984 B2 | 7/2018 | Rajkumar et al. |
| 10,091,972 B1* | 10/2018 | Jensen ................ A01K 5/0283 |
| 10,140,315 B1 | 11/2018 | Hohwald et al. |
| 10,438,277 B1 | 10/2019 | Jiang et al. |
| 10,963,657 B2 | 3/2021 | Rodriguez et al. |
| 2006/0120609 A1 | 6/2006 | Ivanov et al. |
| 2009/0176526 A1* | 7/2009 | Altman ................ G06F 19/3475 455/556.1 |
| 2010/0103241 A1 | 4/2010 | Linaker |
| 2010/0241596 A1 | 9/2010 | Lee et al. |
| 2010/0250535 A1 | 9/2010 | Loftus et al. |
| 2011/0098056 A1 | 4/2011 | Rhoads et al. |
| 2012/0055718 A1* | 3/2012 | Chen .................. G06F 19/3475 177/3 |
| 2012/0179665 A1* | 7/2012 | Baarman ............ G06F 19/3475 707/709 |
| 2013/0083064 A1* | 4/2013 | Geisner ................ G06F 16/434 345/633 |
| 2013/0114849 A1 | 5/2013 | Pengelly et al. |
| 2014/0102957 A1* | 4/2014 | Broeker ............... G01G 19/445 210/85 |
| 2014/0172313 A1* | 6/2014 | Rayner ................. G16H 50/30 702/19 |
| 2014/0254865 A1 | 9/2014 | Soubra |
| 2014/0307923 A1 | 10/2014 | Johansson |
| 2014/0315162 A1* | 10/2014 | Ehrenkranz ........ G01G 19/4146 434/127 |
| 2014/0364971 A1* | 12/2014 | Minvielle ............... G06F 16/30 700/90 |
| 2015/0036881 A1 | 2/2015 | Sharma et al. |
| 2015/0078613 A1 | 3/2015 | Forutanpour et al. |
| 2015/0132722 A1* | 5/2015 | Menczel ............... A61B 5/1118 434/127 |
| 2015/0260699 A1* | 9/2015 | Minvielle ............... G06F 16/00 426/231 |
| 2016/0012748 A1* | 1/2016 | Donavon ........... G09B 19/0092 434/225 |
| 2016/0086029 A1 | 3/2016 | Dubuque |
| 2016/0110793 A1 | 4/2016 | Herring et al. |
| 2016/0148536 A1* | 5/2016 | Ashby ................ G09B 19/0092 434/127 |
| 2016/0252390 A1* | 9/2016 | Batsikouras ........... G01G 19/52 177/25.13 |
| 2016/0270574 A1* | 9/2016 | Dekar ..................... A47G 21/08 |
| 2016/0314380 A1 | 10/2016 | Abdulkader et al. |
| 2017/0046596 A1 | 2/2017 | Bobbitt et al. |
| 2017/0046980 A1* | 2/2017 | Mehta ................ G09B 19/0092 |
| 2017/0124912 A1* | 5/2017 | Ashby ................ G09B 19/0092 |
| 2017/0221296 A1* | 8/2017 | Jain ....................... G07F 11/165 |
| 2017/0249491 A1 | 8/2017 | MacIntosh et al. |
| 2018/0011876 A1 | 1/2018 | Li et al. |
| 2018/0063900 A1* | 3/2018 | Minvielle ................. A23L 3/00 |
| 2018/0149519 A1* | 5/2018 | Connor ................... G01N 33/02 |
| 2018/0232689 A1* | 8/2018 | Minvielle ................. G06T 7/11 |
| 2018/0233064 A1* | 8/2018 | Dunn ................ G09B 19/0092 |
| 2018/0330238 A1 | 11/2018 | Luciw et al. |
| 2018/0338354 A1* | 11/2018 | Bassill ................ H05B 6/6464 |
| 2019/0114333 A1 | 4/2019 | Benboubakeur et al. |

OTHER PUBLICATIONS

Office Action for U.S. Appl. No. 16/746,472, dated May 5, 2021, Angel, "Image-Based Item Identification", 31 pages.

\* cited by examiner

ITEM RECOGNITION AND ANALYSIS

BACKGROUND

Food intake and use tracking can be important to a wide range of people. Some people track the food items they are eating and/or associated nutritional information. Chefs in restaurants or in cooking videos often provide nutritional information to customers and viewers. Described herein are improvements in technology that will help, among other things, the recognition and analysis of food items.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
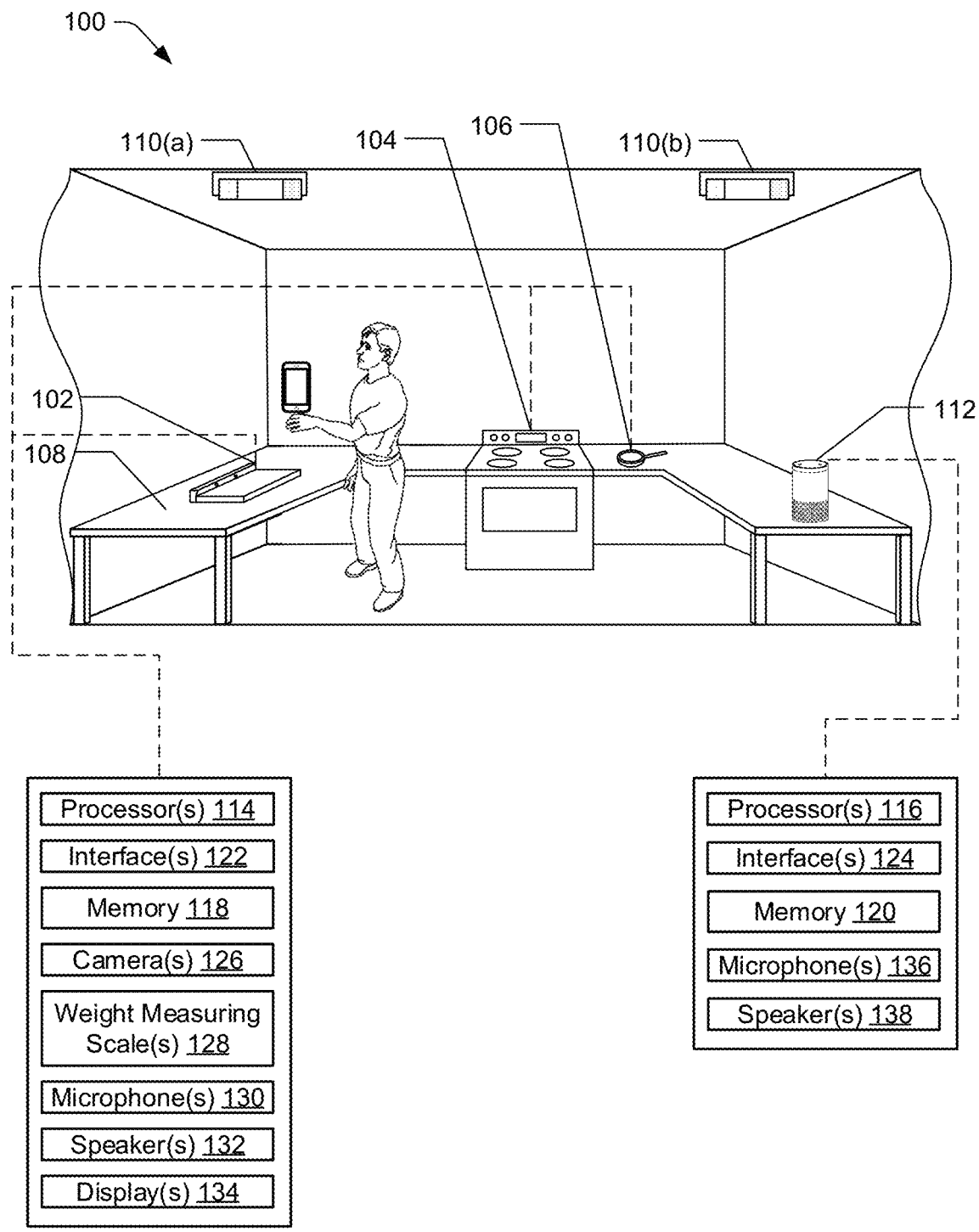
FIG. 1 illustrates a schematic diagram of an example system for food recognition and analysis.

Systems and methods for food recognition and analysis are described herein. Take, for example, a user who may be situated in a kitchen. The user may be engaged in preparing a meal that includes one or more food items. The user may want to track one or more aspects of the meal being prepared, such as, for example, the types of food items that are included in the meal, the quantity of such food items, and/or nutritional information associated with the food items. A user may additionally, or alternatively, desire to utilize the tracked information for one or more purposes, such as, for example, tracking individual food consumption, tracking individual nutrition intake, tracking group food consumption and/or nutrition intake, following preexisting recipes, modifying preexisting recipes, generating recipes, and/or generating food labels. The systems and methods described herein provide such functionality For example, a device for recognizing a food item and a device for weighing or otherwise quantifying the amount of the food item may be provided. In examples, the device for recognizing a food item and the device for quantifying the amount of the food item may be the same device or the two devices may be separate. By way of illustration, the device for recognizing a food item may be a camera or multiple cameras. The camera may capture one or more images, which may be described as frames, of an environment that includes a food item. Image data corresponding to the images may be analyzed and/or compared to a database of image data associated with food items to determine the type of food item depicted in the images. Additional, or alternative, components for recognizing the type of food item may be utilized, such as, for example, audio data representing user speech of a user within the environment, spectrography data associated with the food item, identification of a bar code or other identifier associated with the food item, image data associated with food item packaging, and/or data corresponding to a recipe associated with the food item.

In examples, the device for quantifying the food item may include a weight-measuring scale. The food item may be placed on the weight-measuring scale, which may generate data representing the weight of the food item. In addition, or alternatively, image data of the food item may be utilized to determine an exact or approximate volume of the food item, which may be used to determine the quantity of the food item. Once the food item has been recognized and the quantity of the food item has been determined, nutritional information corresponding to the food item may be determined. For example, a database may be accessible that includes information on types of food items along with their corresponding nutritional facts for a given quantity of the food items. The determined quantity of the food item in question may be analyzed with respect to the information in the database to determine the nutritional information associated with the food item. The nutritional information may include one or more aspects of the food item, such as the quantity of the food item and nutrients associated with the food item.

The nutritional information may be stored and/or utilized for one or more purposes. For example, when the food item is one of multiple food items being prepared as a meal, a pre-existing recipe may be associated with the food item and/or a recipe may be modified and/or created. Additionally, or alternatively, portioning of the nutritional information may be utilized to determine, for example, the quantity of a meal, and the related amount of nutritional information, that is apportioned to a specific user, user profile, and/or user account. Macronutrients and/or micronutrients may also be tracked and utilized, such as, for example, as part of a daily food consumption routine. Food labels may also be generated based on recognition and analysis of food items. These food labels may be advantageous to businesses for their product packaging and/or to comply with food-related laws and regulations.

The devices for recognizing and quantifying food items, as described herein, may be components of other devices. For example, the weight-measuring scale may be a component of a cutting board, which may include one or more cameras, microphones, and/or speakers to assist in food item recognition. In other examples, the weight-measuring scale may be a component of a stove top, an oven, a refrigerator, a countertop, and/or a cooking utensil such as a pan, dish, and/or pot.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for food recognition and analysis. System 100 may include a food item recognition and/or quantification device. The food item recognition and/or quantification device may be a component of a cutting board 102, an appliance 104, and/or a cooking utensil 106. The food item recognition and/or quantification device may additionally, or alternatively, be a component of a countertop 108 or other surface or device found in a kitchen, for example. In these examples, the food item recognition component and the food item quantification component may be components of the same device. In other examples, the food item recognition component and the food item quantification component may be separate components found in multiple devices. For example, the food item recognition component may include one or more cameras 110(a) and 110(b). Additionally, or alternatively, the food item recognition component, or a portion thereof, may include an audio input/output device, such as, for example, a communal device and/or a voice-assistant device 112.

The food item recognition and/or quantification components may include one or more processors. As used herein, a processor, such as processor(s) 114 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114 and/or 116 may possess its own local memory, which also may store program components, program data, and/or one or more operating systems.

The food item recognition and/or quantification components may also include memory 118 and/or 120. Memory 118 and/or 120 may include volatile and nonvolatile memory, removable and non-removable media implemented in any method or technology for storage of information, such as computer-readable instructions, data structures, program component, or other data. Such memory 118 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118 and/or 120 may be implemented as computer-readable storage media ("CRSM"), which may be any available physical media accessible by the processor(s) 114 and/or 116 to execute instructions stored on the memory 118 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

Each of the network interface(s) 122 and network interface(s) 124 may enable communications between the components and/or devices shown in system 100 and/or with one or more remote systems, as well as other networked devices. Such network interface(s) can include one or more network interface controllers (NICs) or other types of transceiver devices to send and receive communications over a network.

For instance, each of the network interface(s) 122 and network interface(s) 124 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, each of the network interface(s) 122 and network interface(s) 124 may include a wide area network (WAN) component to enable communication over a wide area network.

The cutting board 102 will be used herein to illustrate functionalities of an example food item recognition and quantification device. However, it should be understood that the other devices, such as the stove top 104, the cooking utensil 106, the countertop 108, the cameras 110(*a*) and 110(*b*), and/or the voice-assistant device 112, among other devices, may include the same or similar functionalities. The cutting board 102, for example, may be configured to receive a food item on a surface of the cutting board 102. One or more cameras 126 may capture image data representing the food item. The cutting board 102 may also include a weight-measuring scale 128 that, when the food item is placed on the cutting board 102, may generate data representing the weight of the food item. The image data and/or the data representing the weight may be analyzed to recognize the type of food placed on the cutting board 102 and how much of the food item has been placed on the cutting board 102, as described hereinafter. The cutting board 102 may additionally, or alternatively, include one or more microphones 130 that may be configured to capture audio representing user speech. The one or more microphones 130 may generate audio data corresponding to the audio. The audio data may be analyzed separate from or in conjunction with the image data from the cameras 126 to recognize the food item. The cutting board 102 may additionally, or alternatively, include one or more speakers 132, which may be configured to output audio related to the food item recognition and/or quantification. For example, once the food item is recognized and quantified, the one or more speakers 132 may output a confirmatory message that the detected food item was, for example, an apple and that the amount of apple is, for example, 20 grams. Additionally, or alternatively, the cutting board 102 may include one or more displays 134, which may be configured to present information related to the recognition and quantification of food items placed on the cutting board 102.

The voice-assistant device 112, in addition to having one or more processors 116, memory 120, and one or more interfaces 124, may include one or more microphones 136. The microphones 136 of the voice-assistant device 112 may be utilized in addition to, or instead of, the microphones 130 of the cutting board 102. The voice-assistant device 112 may additionally include one or more speakers 138. The speakers 138 of the voice-assistant device 112 may be utilized in addition to, or instead of, the speakers 132 of the cutting board 102.

Figure 2:
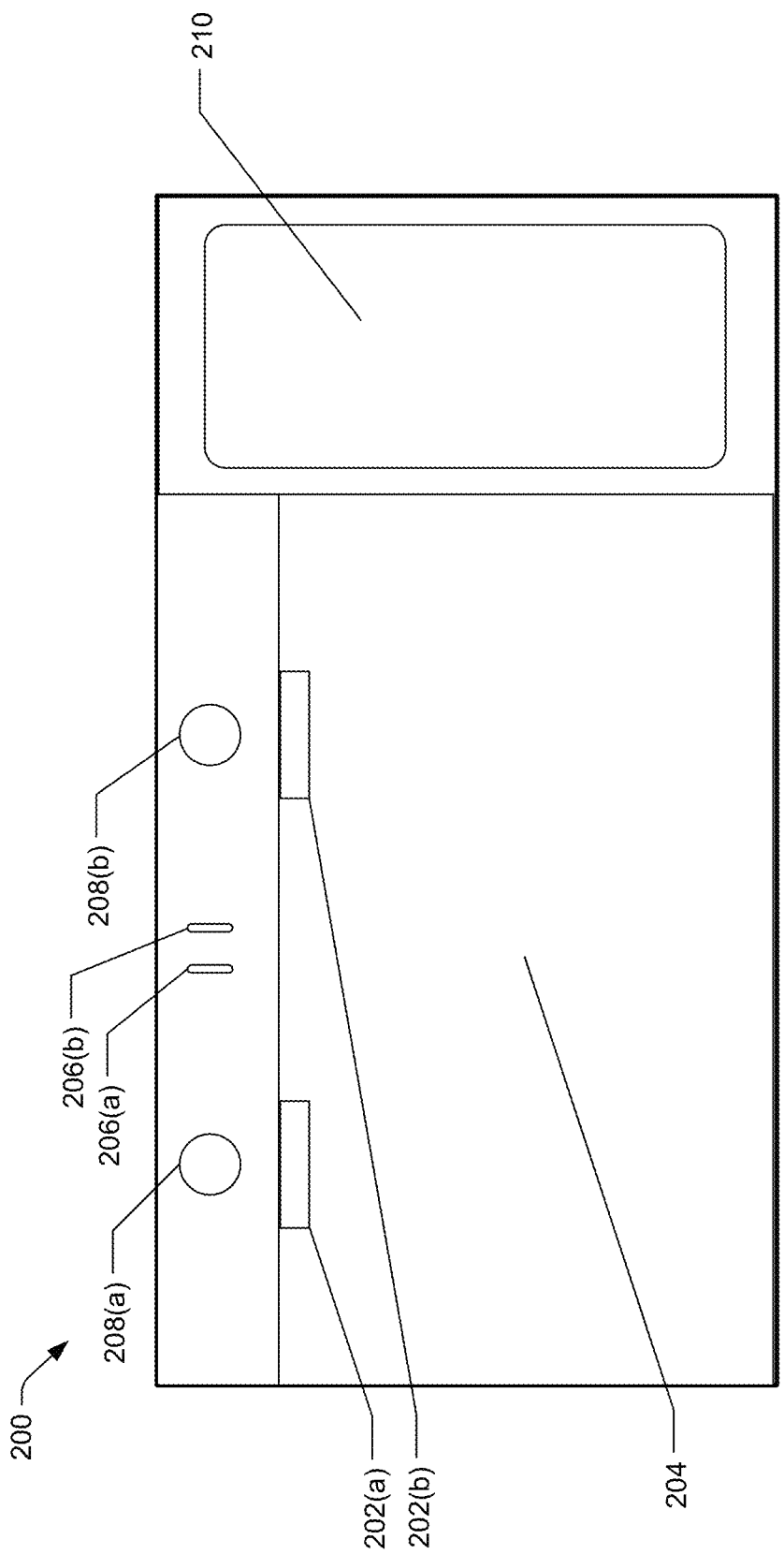
FIG. 2 illustrates a schematic diagram of an example device for food recognition and analysis.

FIG. 2 illustrates a schematic diagram of an example device 200 for food recognition and analysis. The device 200 may be similar to the cutting board 102 described with respect to FIG. 1, above. For example, the device 200 may include one or more cameras 202(*a*) and 202(*b*) and a weight-measuring scale 204. The cameras 202(*a*) and 202(*b*) may capture one or more images of an object placed on the device 200. By way of example, the cameras 202(*a*) and 202(*b*) may initiate the capturing of the one or more images based at least in part on a signal from the weight-measuring scale 204. The signal may indicate that an object has been detected on the surface of the weight-measuring scale 204. Additionally, or alternatively, the cameras 202(*a*) and 202(*b*) may initiate capturing one or more images based at least in part on a user command received via one or more microphones 206(*a*) and 206(*b*) and/or an input received via a display 210, such as a touchscreen. The signal may additionally, or alternatively, be provided from one or more other devices, such as a voice-assistant device or a personal device, for example.

Both or just one of the cameras 202(*a*) and 202(*b*) may capture images. The number of images captured may vary based at least in part on the frames per second (fps) at which the cameras 202(*a*) and 202(*b*) operate or are configured to operate as well as the number of seconds during which the cameras 202(*a*) and 202(*b*) are configured to capture images. In examples, the cameras 202(*a*) and 202(*b*) may be set to an initial fps rate and an initial capture time. By way of example, the initial fps rate may be 30 fps and the capture time may be 5 seconds, which may generate a total of approximately 150 frames per camera. The fps rate and/or the capture time may be dynamic and may adjust based on data relating to previous use of the cameras 202(*a*) and 202(*b*) indicating a minimum fps and capture time that is likely to produce accurate food item recognition above a threshold confidence level.

For example, an apple may be placed on the weight-measuring scale 204. In an instance where the fps rate is initially set at 30 fps and the capture time is initially set to 5 seconds, 150 frames per camera may be captured. During analysis of the image data corresponding to the 150 frames per camera, as discussed in more detail below, a determination may be made that the object on the weight-measuring scale 204 is an apple at 99% confidence after analysis of the 150 frames per camera. Additionally, it may be determined that the object on the weight-measuring scale 204 is an apple at 95% confidence after analysis of 10 frames per camera. In this example, the apple is identified at a high confidence level after even 10 frames are analyzed. As such, the fps rate and/or the capture time may be adjusted such that image data corresponding to fewer frames is analyzed during item recognition. For example, the fps rate may be decreased to 5 fps and the capture time may be decreased to 2 seconds. Likewise, if the set fps and/or capture time provides a number of frames that do not lead to item identification to a high confidence level, the fps rate and/or the capture time may be increased.

The cameras 202(*a*) and 202(*b*) may capture one or more images as described herein and image data corresponding to the images may be generated. The image data may be stored locally on device 200 and/or the image data may be transmitted to a remote system, such as another device associated with the environment of the user, the voice-assistant device 112 for example, and/or to a system remote from the environment of the user, as described below with respect to FIG. 3. The images captured by the cameras 202(*a*) and 202(*b*) may correspond to visible light reflected from a surface of the object on the weight-measuring scale 204. Additionally, or alternatively, the images captured by the cameras 202(*a*) and 202(*b*) may correspond to light outside the visible light spectrum, such as, for example, infrared light reflected from a surface or other portion of the object on the weight-measuring scale 204. When the cameras 202(*a*) and 202(*b*) are components of the same device as the weight-measuring scale 204, such as shown in FIG. 2, the cameras 202(*a*) and 202(*b*) may be disposed at locations that provide differing viewpoints with respect to the object on the weight-measuring scale 204. Additionally, or alternatively, the cameras 202(*a*) and 202(*b*) may be stationary with respect to the weight-measuring scale 204 or the cameras 202(*a*) and 202(*b*) may move. For example, the cameras 202(*a*) and 202(*b*) may rotate about the weight-measuring scale 204, may move horizontally with respect to the surface of the weight-measuring scale 204, may move vertically with respect to the surface of the weight-measuring scale 204, and/or may move closer to and/or farther from the surface of the weight-measuring scale 204. Additionally, or alternatively, the cameras 202(*a*) and 202(*b*) may be configured to adjust zoom parameters, pan parameters, and/or tilt parameters. These parameters may be adjusted manually, such as by a user of the device 200, and/or via instructions provided to the cameras 202(*a*) and 202(*b*) from one or more processors. Additionally, the parameters may be adjusted via physical changes to the cameras 202(*a*) and 202(*b*) and/or digital changes to the image data generated by the cameras 202(*a*) and 202(*b*).

In the example shown in FIG. 2, two cameras 202(*a*) and 202(*b*) are shown. However, it should be appreciated that one camera may be used or more than two cameras may be used. For example, four cameras may be associated with the device 200. The four cameras may be situated to capture images that depict all or substantially all of the object placed on the weight-measuring scale 204. In examples where more than one camera is associated with the device 200, image data corresponding to an image from a first camera may be stitched together or otherwise associated with an image from the second camera to generate a full or partial three-dimensional model of the object on the weight-measuring scale 204. Additionally, or alternatively, the one or more cameras may be a component of the weight-measuring scale 204 and may be positioned to point outward from the surface of the weight-measuring scale 204. In these examples, the weight-measuring scale may be transparent or substantially transparent to allow light reflected off the object to be captured by the one or more cameras.

Additionally, or alternatively, in instances where multiple cameras are utilized, all of the cameras may capture images of the object or only a portion of the multiple cameras may capture images of the object. In examples, one or a portion of the cameras may be utilized to capture images. If analysis of first image data corresponding to the images provides for identification of the object at a high confidence level, the remaining cameras may not be utilized. However, if the object is not identified or is identified at below a threshold confidence level, one or more of the remaining cameras may initiate capturing images of the object and second image data corresponding to the images may be analyzed separately or in conjunction with the first image data to identify the object. Additionally, or alternatively, use of a portion of the multiple cameras may be based at least in part on a determination of whether the object is occluded or partially occluded from view of one or more of the cameras. The cameras having an occluded view may not be utilized to capture images and/or such cameras may be moved to a position with an unoccluded or less occluded view. A preview or example image or video feed of the object being viewed by the cameras may be displayed, such as, for example, on display 210.

Also in the example shown in FIG. 2, the cameras 202(*a*) and 202(*b*) are depicted as components of device 200. However, it should be appreciated that the cameras 202(*a*) and 202(*b*) may be separate components from the device 200 and may be situated elsewhere in the environment in which the weight-measuring scale 204 is disposed. For example, one or more cameras may be mounted in a room, such as, for example, a kitchen. The one or more cameras may be mounted near the weight-measuring scale 204, such as, for example, on a countertop, a wall, a cabinet, an appliance, a light, and/or a ceiling of the environment in which the weight-measuring scale 204 is disposed.

With respect to the weight-measuring scale 204, as shown in FIG. 2, it may have a flat surface sized to receive one or multiple objects, such as, for example, when the weight-measuring device 204 is a component of a cutting board, a countertop, a stove top, or other appliance. In other examples, the weight-measuring scale 204 may include a surface with a rounded, concave, and/or beveled surface, such as, for example, when the weight-measuring scale 204 is a component of a pan, a bowl, a plate, a pot, or other baking or cooking device. The weight-measuring scale 204 may be configured to weigh one or more objects placed on the weight-measuring scale 204. While the word "weight" is used herein, other units of quantification may also be used. For example, volume and/or density may be determined based at least in part on analysis of the mass of an object in conjunction with image data from the cameras 202(*a*) and 202(*b*). Weight may be provided in one or multiple units of measurement, such as, for example, grams and/or pounds. Additionally, or alternatively, the weight-measuring scale 204 may have one or multiple weighing sections. For example, when the weight-measuring scale 204 has multiple weighing sections, multiple objects may be placed on the weight-measuring scale 204 at the same time and each object may be independently weighed. In these examples, an indication, such as a visual indication, demarcating the multiple weighing sections may be provided.

The weight-measuring scale 204 may generate data corresponding to a weight of one or more objects placed on a surface of the weight-measuring scale 204. The data may be stored at device 200 and/or the data may be transmitted to a remote system, such as the voice-assistant device 112 from FIG. 1 and/or to a remote system as described with respect to FIG. 3 below. Additionally, or alternatively, data corresponding to a time may be generated and may be used to associate the weight data with image data generated by the cameras 202(*a*) and 202(*b*). In this way, the image data and the weight data may be analyzed in conjunction with each other to identify the object and/or quantify the object.

The device 200 may additionally include one or more microphones 206(*a*) and 206(*b*). While two microphones are depicted with respect to FIG. 2, it should be appreciated that only one microphone may be provided or more than two microphones may be provided. The microphones 206(*a*) and 206(*b*) may be configured to receive audio representing sound from an environment in which the device 200 is disposed. The sound may include, for example, user speech and/or background noise. The sound may be captured by the microphones 206(*a*) and 206(*b*) and may be converted to audio data representing the sound. Automatic speech recognition may be performed on the audio data to generate text data corresponding to the user speech. Natural language understanding techniques may be performed on the text data to determine one or more intents associated with the user speech. Automatic speech recognition and natural language understanding is described more fully below with respect to FIG. 13. By way of example, the intents corresponding to the user speech may be, for example, an intent to indicate that an object has been placed on the weight-measuring scale 204, a command to identify and/or quantify the object, a confirmation that the detected object is the object on the weight-measuring scale 204, a notification that the detected object is not the object on the weight-measuring scale 204, and/or other intents associated with identification and/or quantification of the object and/or intents associated with the use of information associated with the object.

The device 200 may additionally include one or more speakers 208(*a*) and 208(*b*). While two speakers are depicted with respect to FIG. 2, it should be appreciated that only one speaker may be provided or more than two speakers may be provided. The speakers 208(*a*) and 208(*b*) may be configured to receive audio data, such as, for example, from memory local to the device 200 and/or from a remote system. The speakers 208(*a*) and 208(*b*) may output audio corresponding to the received audio data. The audio may provide an audible notification or query to the user of the device 200. For example, the audible notification may be identification of the object on the weight-measuring scale 204, an indication of the quantity of the object, a prompt for the user to provide a confirmatory statement related to the detected object, and/or acknowledgement of user-provided information.

The device 200 may additionally include a display 210. The display 210 may be a fixed component of the device 200. In other examples, the display 210 may be removably coupled to the device 200, such as, for example, via a docking station. In examples, the display 210 may be provided along with the other components of the device 200. In other examples, the display 210 may be provided separate from the other components of the device 200 and/or may be provided by a third-party. The display 210 may be configured to present information related to identification and/or quantification of objects placed on the weight-measuring scale 204. The display 210 may additionally, or alternatively, be configured to display information related to previously-weighed objects and supplement information related to such objects. Such supplemental information may include, for example, a recipe, recipe modifications, a food label, nutritional information, portion size information, and/or periodic food use information. The display 210 may additionally, or alternatively, be configured to receive input. For example, the display 210 may be a touchscreen, which may accept touch input. In general, the components of FIG. 2 may be utilized, at least in part, to identify an object placed on the device 200 and to quantify that object.

Figure 3:
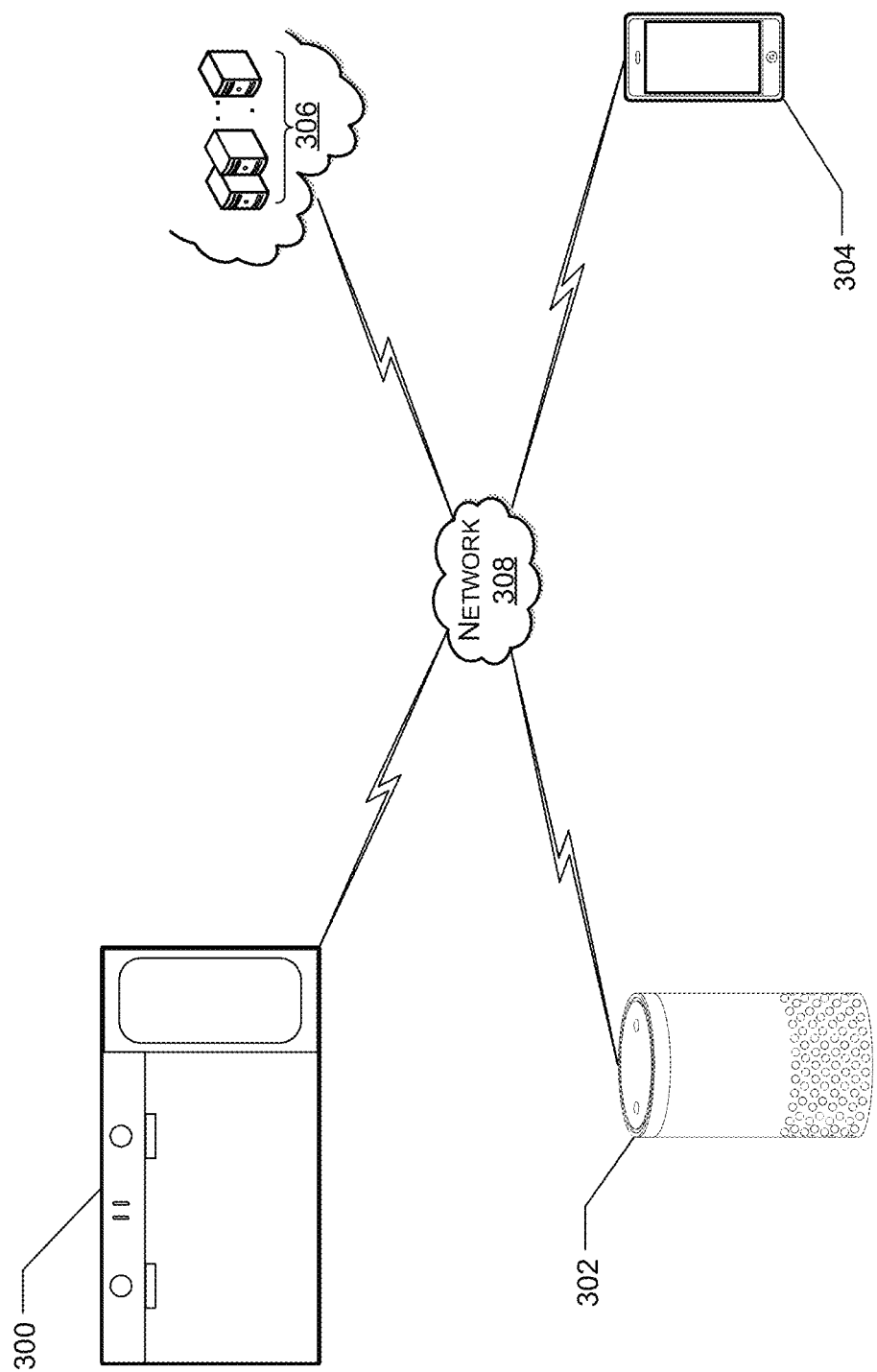
FIG. 3 illustrates a schematic diagram of example devices and systems for food recognition and analysis.

FIG. 3 illustrates a schematic diagram of example devices and systems for food recognition and analysis. For example, a device 300 for object recognition and analysis may be the same as or similar to the device 200 from FIG. 2. The device 300 may include the same or similar components to the device 200. For example, the device 300 may include one or more cameras, a weight-measuring scale, one or more microphones, one or more speakers, and/or a display. The device 300 may additionally, or alternatively, include other components such as, for example, a mass spectrometer, an infrared spectrometer, a barcode scanner, and/or a Quick Response Code (QRC) scanner. The components of the device 300 may generate data that may be utilized to identify and/or quantify one or more objects placed on or in proximity to the device 300. For example, image data generated by the cameras may be utilized to identify the object and/or to determine a volume of the object.

Additionally, or alternatively, the microphones may generate audio data corresponding to user speech identifying the object. Additionally, or alternatively, the mass spectrometer and/or infrared spectrometer may generate spectrography data corresponding to the object, which may be analyzed with respect to known spectrography data to identify the object. Additionally, or alternatively, the barcode scanner may be utilized to detect a barcode situated proximate to the device 300. For example, a barcode may be provided as a portion of packaging associated with an object. Once scanned, the barcode may be analyzed with respect to known barcodes to identify the object. Additionally, or alternatively, the QRC scanner may be utilized to detect a QRC situated proximate to the device 300. For example, a QRC may be provided as a portion of packing associated with an object. Once scanned, QRC may be analyzed with respect to known QRCs to identify the object. Additionally, or alternatively, data representing a recipe and/or list of items may be provided to and/or stored on the device 300. The objects associated with the recipe and/or list of items may be utilized, such as in conjunction with the other data described herein, to identify the object and or to quantify the object.

The device 300 may transmit and receive data, via a wired or wireless network 308, to one or more additional devices and/or systems. For example, data may be transmitted and received from a communal device, such as a voice-assistant device 302, which may be associated with the same environment as the device 300. The voice-assistant device 302 may include one or more microphones, one or more speakers, one or more processors, memory, and interface(s). Instead of, or in addition to, the microphones of the device 300, the microphones of the voice-assistant device 302 may capture audio representing user speech and convert that audio to audio data. Automatic speech recognition and/or natural language understanding techniques may be performed on the audio data to determine an intent of the user. The intent may be with respect to the device 300 and/or operation of the same. By way of example, a user may utter the phrase "Alexa, start food measurement." The audio corresponding to this phrase may be captured by the microphones of the voice-assistant device 302 and corresponding audio data may be generated. In this example, the word "Alexa" may act as a trigger expression or "wake word" to inform the voice-assistant device 302 that the user is providing an utterance. The use of trigger expressions is described in more detail with respect to FIG. 13 below. The words "start food measurement" may be associated with an intent to activate the device 300 and/or to cause the device 300 to initiate capturing of data for identification and quantification of one or more objects. One or more additional statements, commands, and queries may be accepted by the voice-assistant device 302 to control functionality of the device 300. The speakers of the voice-assistant device 302 may output audio related to the item identification and quantification associated with the device 302.

The one or more devices depicted in FIG. 3 may additionally, or alternatively, include a personal device 304, such as a mobile device and/or a stationary device. The personal device 304 may include one or more microphones, one or more speakers, a display, one or more processors, memory, and interface(s). The microphones, speakers, and display may be in addition to the microphones, speakers, and display of the device 300, or the device 300 may not include microphones, speakers, and/or a display. The microphones and speakers of the personal device 304 may perform functions similar to those described with respect to the voice-assistant device 302. Additionally, or alternatively, the display of the personal device 304 may perform functions similar to those described with respect to the display of the device 300. Additionally, the personal device 304 may include one or more cameras. The cameras of the personal device 304 may perform functions similar to those described with respect to the cameras of the device 300.

The one or more devices depicted in FIG. 3 may additionally, or alternatively, include a remote system 306. In some instances, the remote system 306 may be local to an environment associated the device 300, the voice-assistant device 302, and/or the personal device 304. For instance, the remote system 306 can be located within the device 300, the voice-assistant device 302, and/or the personal device 304. In some instances, some or all of the functionality of the remote system 306 may be performed by one or more of the device 300, the voice-assistant device 302, or the personal device 304.

In some instances, the remote system 306 is configured to identify, via first data received from the device 300, an object, such as a food item, placed on the weight-measuring scale of the device 300. The first data may include image data, audio data representing user speech, spectrography data, data related to a barcode and/or a QRC, and/or data representing a recipe. The remote system 306 may be further configured to receive and/or determine, via second data received from the weight-measuring scale of the device 300, data representing a weight and/or mass of the object. The remote system 306 may be further configured to determine, based at least in part on the first data and the second data, information corresponding to the object. The information may include identification of the object and/or the quantity of the object. In instances where the object is a food item, the information may include nutritional information, such as the amount of macronutrients and/or micronutrients, a number of servings, food apportionment, recipe modifications, etc. The nutritional information may additionally, or alternatively, include an indication of one or more allergens or potential allergens associated with the food item. For example, if the item is determined to be an item commonly associated with an allergy or allergic reaction, such as, for example, eggs, milk, nuts, fish, shellfish, soy, and/or wheat, an indication that the food item is and/or contains one or more of these items may be provided. Additionally, or alternatively, if the item is determined to be an item that a particular person associated with a particular user profile and/or user account is allergic to, such as chicken, for example, an indication of that allergen may be provided. Additionally, or alternatively, a user profile may include an indication of preferred food items and/or food items that should be specifically tracked given the user's diet or other considerations. The nutritional information may include an indication that a detected food item is one of the preferred food items.

The remote system 306 may be further configured to store an indication of the identity of the object and the related information with respect to a user profile and/or a user account. A user may be associated with more than one account, and each account may be associated with multiple profiles. The user profiles and/or user accounts may be associated with devices of the user, such as, for example, phones, computers, tablets, and/or personal assistants. Additionally, or alternatively, the user profiles and/or user accounts may be associated with one or more applications, which may be stored on user devices and/or on a remote system. Additionally, or alternatively, multiple user accounts may be associated with a communal device or multiple profiles may be associated with a communal profile that is associated with a communal device. The remote system 306 may be further configured to present, audibly and/or visually, the information to a device associated with the user profile. The device may be the device 300 and/or the personal device 304, for example. The information may be utilized on its own or in addition to previously-stored information to provide the user associated with the user profile nutritional indications.

The remote system 306 may be configured to perform one or more additional functions, including for example, apportioning nutritional information to the user profile based at least in part on an indication that a portion of one or more food items is consumed or used by the user associated with the user profile. The additional functions may additionally, or alternatively, include causing generation of a food label based at least in part on analyzing nutritional information in conjunction with serving size information. The additional functions may additionally, or alternatively, include causing generating of data representing a recipe when more than one food item is placed on the device 300. The additional functions may additionally, or alternatively, include modifying a recipe based at least in part on data indicating that a detected quantity of a food item associated with the recipe is more than or less than a stated quantity of the food item of the recipe. The additional functions may additionally, or alternatively, include determining that the food item is a fruit and determining, based at least in part on the first data, a ripeness level of the fruit. The nutritional information may be based at least in part on the determined ripeness level.

Additionally, or alternatively, the memory of one or more of the device 300, the voice-assistant device 302, and/or the personal device 304, when executed by the processor(s) of those devices, may cause the processor(s) to perform operations similar to those described above with respect to the remote system 306. For example, the device 300 may be configured to identify an object, such as a food item, placed on the weight-measuring scale of the device 300 using image data, audio data representing user speech, spectrography data, data related to a barcode and/or a QRC, and/or data representing a recipe. The device 300 may be further configured to determine, via the weight-measuring scale, a weight and/or mass of the object. The device 300 may be further configured to determine, based at least in part on the identification of the object and the quantity of the object, information corresponding to the object. The information may include identification of the object and/or the quantity of the object. In instances where the object is a food item, the information may include nutritional information, such as the amount of macronutrients and/or micronutrients, a number of servings, food apportionment, recipe modifications, etc.

The device 300 may be further configured to store an indication of the identity of the object and the related information with respect to a user profile and/or a user account. The device 300 may be further configured to present, audibly and/or visually, the information to a device associated with the user profile. The device may be the device 300 and/or the personal device 304, for example. The information may be utilized on its own or in addition to previously-stored information to provide the user associated with the user profile nutritional indications.

The device 300, the voice-assistant deice 302, and/or the personal device 304 may be configured to perform one or more additional functions, including for example, apportioning nutritional information to the user profile based at least in part on an indication that a portion of one or more food items is consumed or used by the user associated with the user profile. The additional functions may additionally, or alternatively, include causing generation of a food label based at least in part on analyzing nutritional information in conjunction with serving size information. The additional functions may additionally, or alternatively, include causing generation of data representing a recipe when more than one food item is placed on the device 300. The additional functions may additionally, or alternatively, include modifying a recipe based at least in part on data indicating that a detected quantity of a food item associated with the recipe is more than or less than a stated quantity of the food item of the recipe. The additional functions may additionally, or alternatively, include determining that the food item is a fruit and determining, based at least in part on image data, a ripeness level of the fruit. The nutritional information may be based at least in part on the determined ripeness level.

Figure 4:
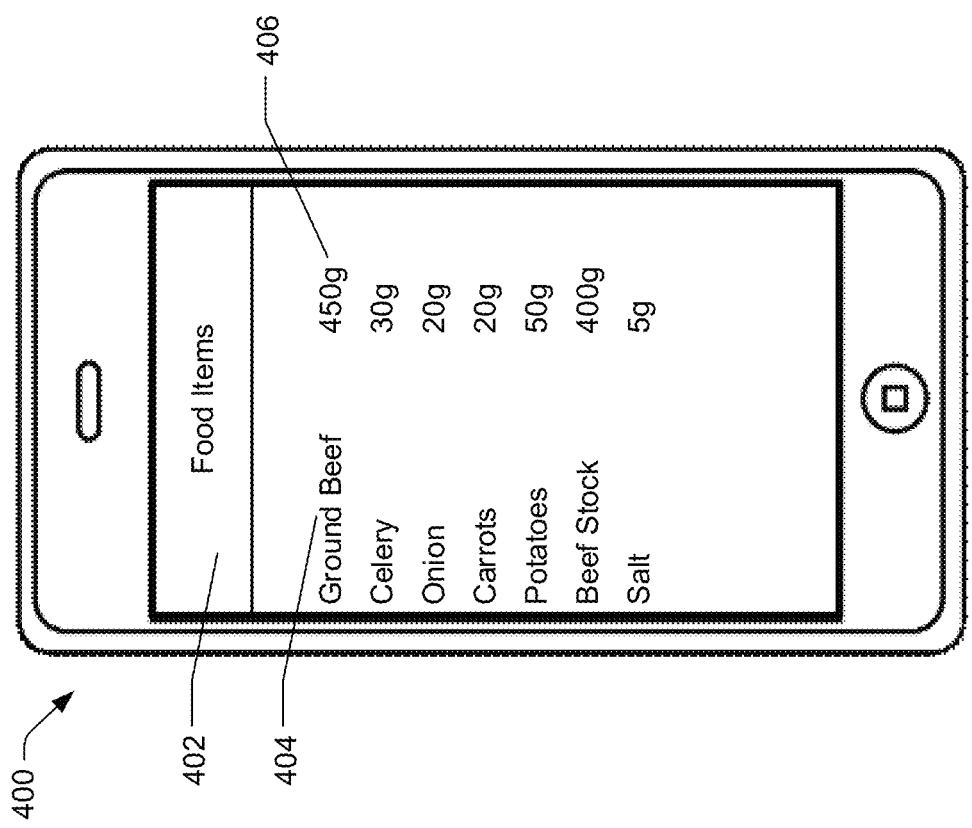
FIG. 4 illustrates an example user interface configured to display information related to food recognition and analysis.

FIG. 4 illustrates an example user interface 400 that is configured to display information related to food recognition and analysis. The user interface 400 may be in wired or wireless communication with a food recognition and analysis device, such as the device 200 from FIG. 2. The user interface 400 may include a header window 402, which may provide a visual indication of the category of information being displayed on the user interface 400. In the example shown in FIG. 4, the header window 402 includes the phrase "Food Items," indicating that the object being recognized relates to food. The user interface 400 may present a food item indication 404 of the food item that was recognized by the device 200, such as, for example, "Apple." The level of detail of the food item indication 404 may vary.

For example, in instances where the food item is identified with a high degree of specificity and/or a high degree of confidence, a more specific food item indication 404 may be provided. Continuing with this example, identification of an apple with a high degree of specificity and/or a high degree of confidence may result in a food item indication 404 of "Red Apple" and/or "Honeycrisp Apple," whereas identification of an apple with a low degree of specificity may result in a food item indication 404 of "Apple" and identification of an apple with a low degree of confidence may result in a food item indication 404 of "Fruit."

A quantity indication 406 may additionally, or alternatively, be presented on the user interface 400. The quantity indication 406 may be based at least in part on the weight data received from the weight-measuring scale. While FIG. 4 illustrates the quantity indication 406 as a measurement in grams, additional or other measurements and/or units of measurement may be utilized. For example, the quantity indication 406 may be presented in terms of pounds, volume, number of items, and/or other units of mass. When multiple food items are identified, either sequentially or in parallel, multiple food item indicators 404 and corresponding quantity indications 406 may be presented on the user interface 400.

A confidence indicator, not shown in FIG. 4, may also be presented on the user interface 400. For example, food items identified at a high confidence level may be associated with a specific color, such as green, while food items identified at a mid-confidence level may be associated with a different color, such as yellow. Food items identified at a low confidence level may be associated with yet a different color, such as red. Confidence indicators may additionally, or alternatively, be presented with respect to the quantity indications 406. In addition to, or instead of, colored confidence indicators, numerical confidence indicators may be presented, such as percentage confidence that the detected food item is the food item placed on the device 200.

Figure 5:
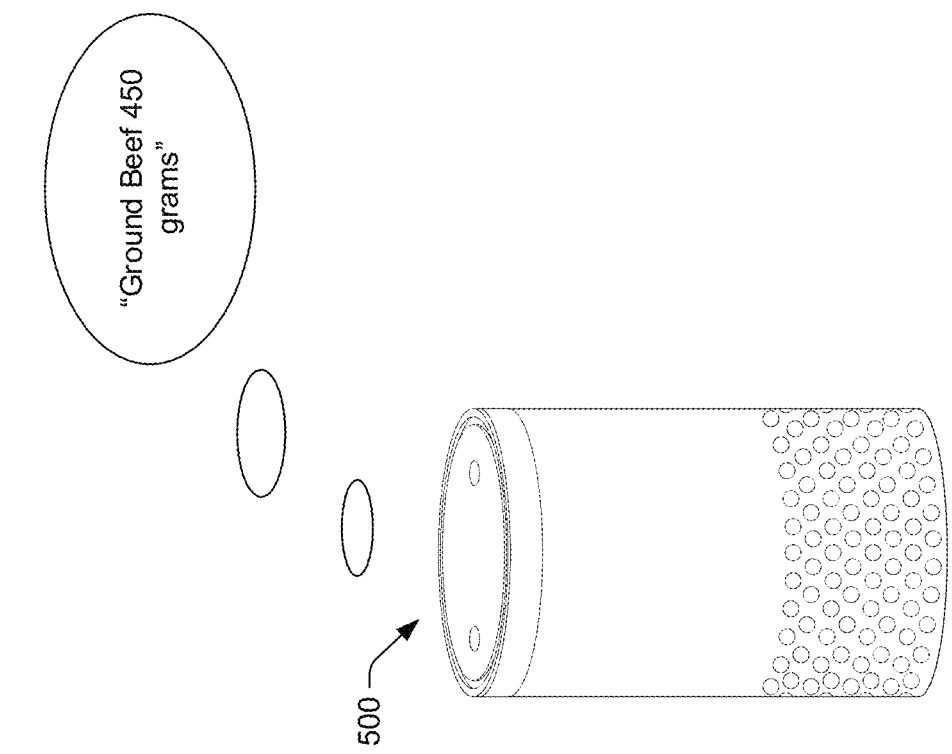
FIG. 5 illustrates an audio output device configured to output information related to food recognition and analysis.

FIG. 5 illustrates an audio output device 500 configured to output information related to food recognition and analysis. The audio output device 500 may include the same or similar components as those of the voice-assistant device 302 described with respect to FIG. 3. For example, the audio output device 500 may include one or more microphones, one or more speakers, one or more processors, memory, and interface(s) that may also the audio output device 500 to communicate, via wired or wireless connection, with the food recognition and analysis device, such as device 300, and/or other devices, such as the personal device 304 and/or the remote system 306.

The audio output device 500 may receive data indicating the identity of an object placed on the weight-measuring scale and/or a quantity of the object. Based at least in part on receiving the data, the audio output device 500 may output audio, via the one or more speakers of the audio output device, corresponding to the data. For example, as shown in FIG. 5, the audio may correspond to a statement such as "Ground Beef 450 grams." This audio may represent an audible indication to a user of the food recognition and analysis device that the food item placed on the weight-measuring scale has been identified, what food item was identified, that a quantity of the food item has been determined, and/or what the quantity of the food item is. The specificity of the statement may vary in a manner similar to the specificity of the food item indication 404 and/or the quantity indication 406 from FIG. 4. The audio output device 500 may output audio as described herein based at least in part on receiving the data indicating the identity of the object and/or the quantity of the object, or the audio output device 500 may output the audio in response to a query from a user of the device.

Figure 6:
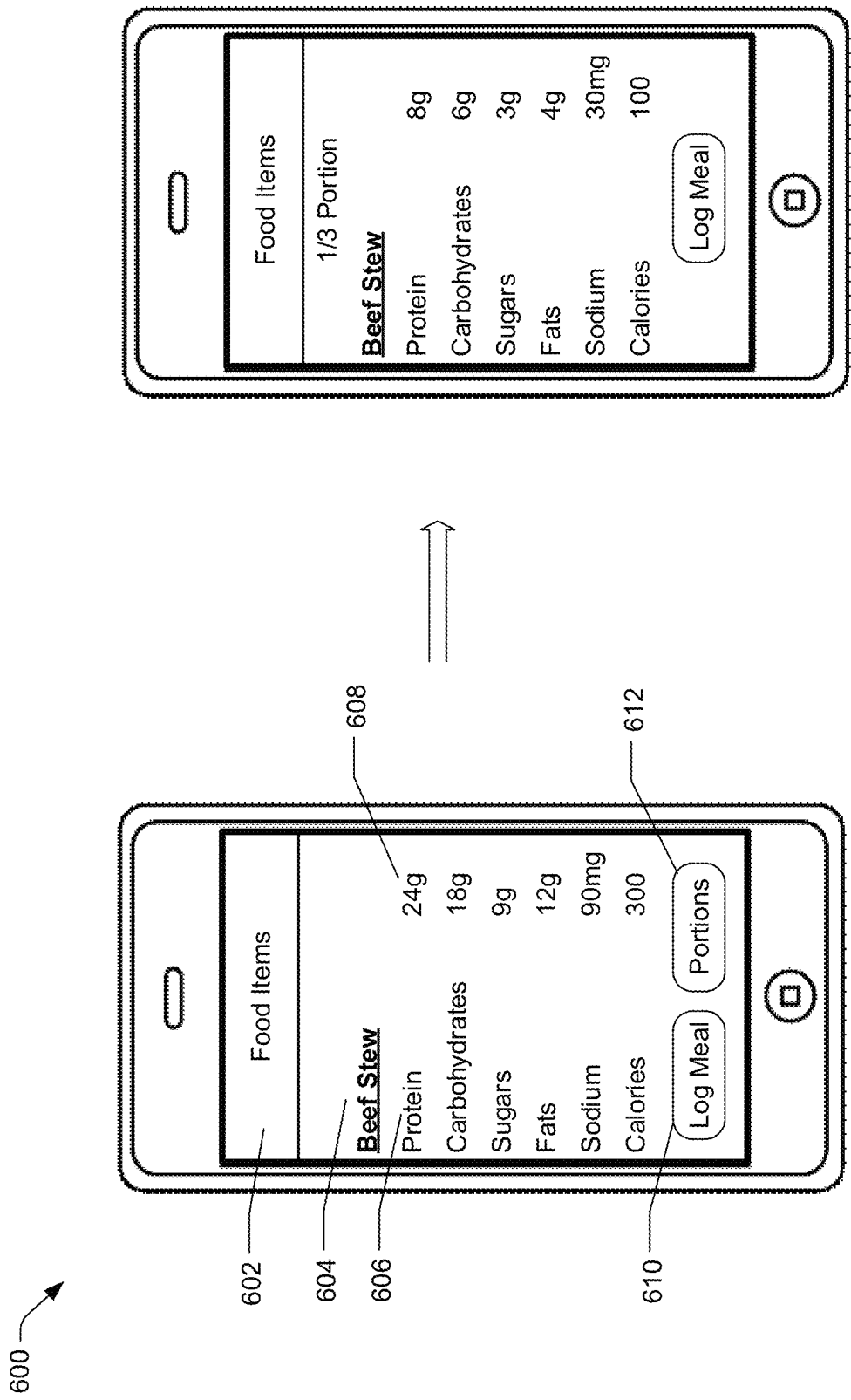
FIG. 6 illustrates an example user interface configured to display information associated with food recognition and analysis.

FIG. 6 illustrates an example user interface 600 configured to present information associated with food recognition and analysis. The images of the user interface 600 as depicted in FIG. 6 represent a progression, from left to right, of changes to the user interface 600 as the user interacts with the user interface 600. The user interface 600 may include the same or similar components as user interface 400. For example, the user interface 600 may include a header window 602. The user interface 600 may also include a meal indicator 604. The meal indicator 604 may be associated with a known recipe and/or the meal indicator 604 may be an automated estimation of a meal being prepared based at least in part on the food items that have been detected. Alternatively, the meal indicator may be the name of a meal as designated by a user of the food recognition and analysis device. In the example shown in FIG. 6, the meal indicator 604 is "Beef Stew."

The user interface 600 may additionally include one or more nutrient indicators 606. The nutrient indicators 606 may include macronutrients and/or micronutrients corresponding to the identified food item(s) and the quantity of those food item(s). Using the example from FIG. 6, ground beef may be identified as a food item placed on the weight-measuring scale and the quantity of the ground beef may be, for example, approximately 25 grams. This data may be compared to one or more databases that contain information on the macronutrients and/or micronutrients of a certain quantity of a food item, such as ground beef. The detected identity of the food item and the detected quantity of the food item may be analyzed with respect to the database to determine the macronutrients and/or micronutrients of the detected food item. In the example of FIG. 6, macronutrients such as protein, carbohydrates, and fats are provided as nutrient indicators 606, while micronutrients, such as sodium may also be presented. Other nutritional information, such as the amount of sugar and calories of the meal, may also be presented. A quantity indication 608 may be presented corresponding to the amount of some or all of the macronutrients, micronutrients, and other nutritional information.

The user interface 600 may also allow a user to track the nutritional information about the meal. This ability is illustrated as the Log Meal indicator 610 in FIG. 6, the text of which is presented by way of illustration only. Upon receiving an indication that the Log Meal indicator 610 has been selected, all or a portion of the nutritional information associated with the meal may be stored with respect to a user profile. The nutritional information may be stored in memory local to the device displaying the user interface 600 and/or the nutritional information may be stored in memory of a remote system. The nutritional information for the meal may be combined with nutritional information from one or more previous meals. The food item identification information and quantity information may also be used to generate a recipe and/or to supplement an existing recipe. For example, the user may provide an indication that the food items should be associated with each other as a recipe. One or more directions, such as cooking directions, may be added to the food item information to provide a list of recipe ingredients as well as directions for preparing the meal that includes the ingredients.

The user interface 600 may also allow a user to apportion a meal. This ability is illustrated as the Portions indicator 612 in FIG. 6, the text of which is presented by way of illustration only. Upon receiving an indication that the Portions indicator 612 has been selected, the user may be prompted to provide an estimation of the apportionment of the meal. For example, the user may indicate that the meal is being apportioned between multiple people and the user may indicate approximately how much of the meal is being apportioned to each person. In other examples, the user may provide an indication as to the quantity being apportioned to the user profile associated with the user interface 600, such as, for example, a volume or weight of the quantity being apportioned. The quantity indication may be utilized to determine a portion of the meal that is apportioned to the user profile.

As illustrated in FIG. 6, the amount apportioned to the user profile associated with the user interface 600 is ⅓, for example. The nutrient indicators 606 and quantity indicators 608 may be adjusted based at least in part on the determined apportionment of the meal. In other examples, the apportionment of a meal may be performed utilizing the weight-measuring scale. For example, once a meal is prepared, a portion of the meal to be apportioned to the user profile may be placed upon the weight-measuring scale and weighed. An indication that a portion of the food item is apportioned to a user profile may be provided and a determination may be made that the weight of the meal after the apportionment indication is less than the initial weight of the meal. In response to these indications and determinations, the weight of the portion may be analyzed with respect to the overall weight of the meal to determine the portion attributable to the user profile. When nutritional information is determined for the food items placed on the scale, after apportionment, second nutritional information may be generated based on the apportionment. In this example, the weight-measuring scale may be calibrated to account for the vessel that holds the meal. Additionally, or alternatively, image data from the cameras described herein may be utilized to determine the volume of the portion of the meal attributable to the user profile. Once apportioned, the user interface 600 may include functionality that may allow the user to store the nutritional information associated with the apportioned meal, such as, for example, by selection of the Log Meal indicator 610.

Figure 7:
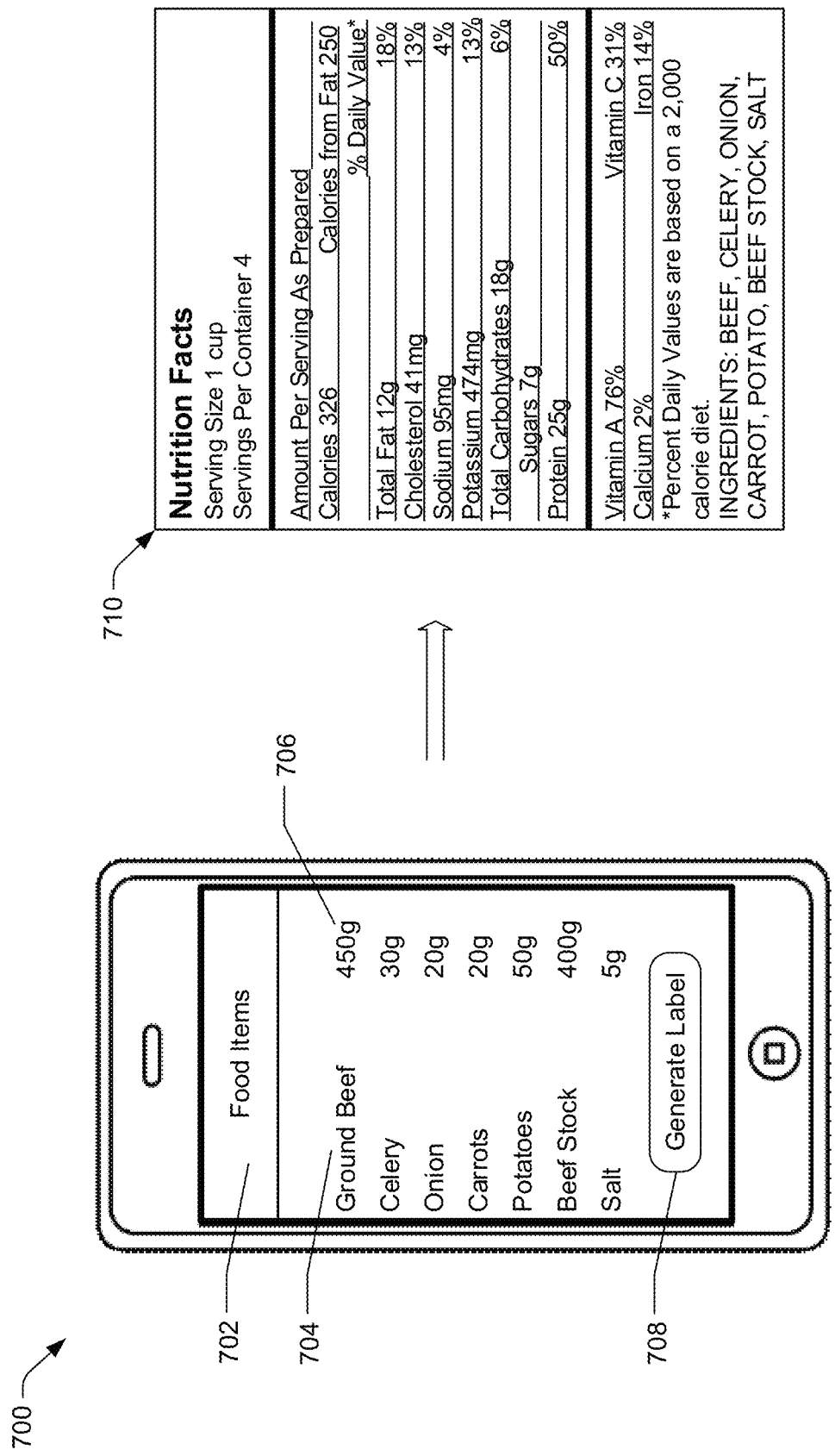
FIG. 7 illustrates an example user interface configured to allow for generation of data representing a food label and an example corresponding food label.

FIG. 7 illustrates an example user interface 700 for generating data representing a food label and a corresponding example food label. The user interface 700 may include the same or similar features as the user interface 400. For example, the user interface 700 may include a header window 702, which may provide an indication of the type of information being presented on the user interface 700. One or more food item indicators 704 and one or more quantity indicators 706 may also be presented in the user interface 700. The user interface 700 may also include functionality to allow for the generation of data representing a label and/or summary of nutritional information associated with the food items that have been recognized and quantified, as described herein. This functionality may be embodied by a selectable portion of the user interface 700, such as, for example, a Generate Label indicator 708, as shown in FIG. 7. It should be understood that, while a user may select a portion of a screen associated with the Generate Label indicator 708, selection of the functionality to generate a label may additionally, or alternatively, include the user providing an audible and/or visual command to generate the label.

Upon receiving an indication that selection of the Generate Label indicator 708 has been selected, data representing a food label 710 may be generated. The information related to the food label 710 may be generated and/or formatted by analyzing the data corresponding to identification of the food item, the data corresponding to the quantity of the food items, and data corresponding to serving size information and nutritional information of the food items. For example, a database may be maintained and/or accessed that includes data indicating the amount of nutrients in food items. Portion size information associated with the food item may be received from the data. The database may also include data indicating the recommended serving size for food items and prepared meals. The serving size and nutritional information may be static or dynamic and may be based at least in part on one or more governmental statutes and/or regulations associated with food. For example, the United States Food and Drug Administration (FDA) may promulgate regulations related to the information that must be provided on a food label. The FDA may also provide a database of the serving size and/or nutritional information. The nutritional information for the food items that were recognized and quantified as described herein may be aggregated to determine the total nutritional information for the food items, which may be presented in terms of serving size. Additionally, the number of portions of the food item may be determined based at least in part on analyzing the portion size information with respect to the weight of the food items.

For example, as shown in FIG. 7, the food label 710 corresponding to the food items shown in user interface 700 may be generated. The food label 710 may include information such as the serving size, the servings per container, macronutrient information, micronutrient information, ingredient information, and explanatory text, for example. The information to be presented on the food label may vary based at least in part on jurisdictional considerations as well as the type of food items that are recognized and quantified.

The food label 710 may be generated and stored on the device presenting the user interface 700 and/or one or more remote devices, such as the remote system 306 of FIG. 3. The device may be in wired and/or wireless communication with a printing component and may send data to the printing component instructing the printing component to print the food label 710.

Figure 8:
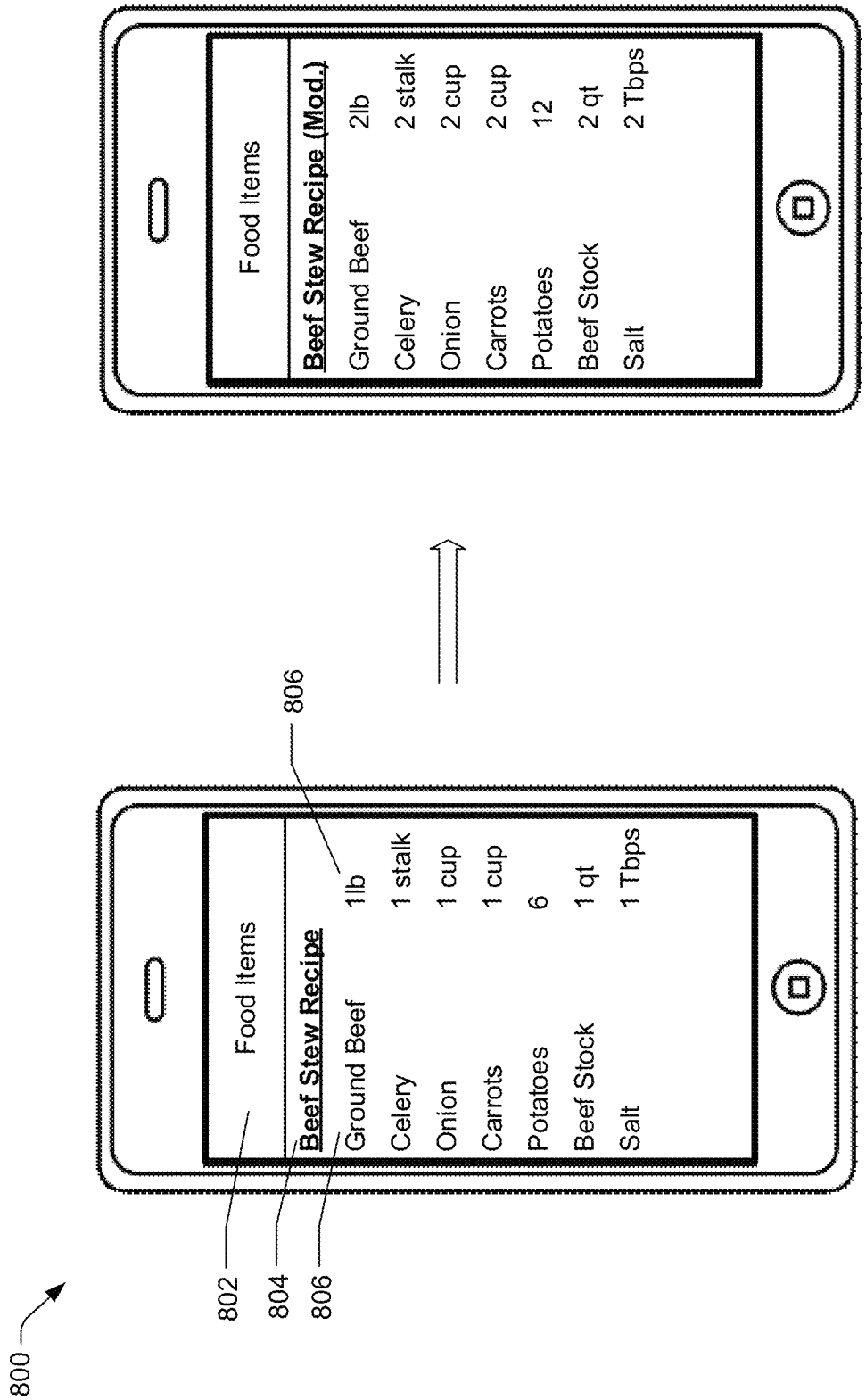
FIG. 8 illustrates another example user interface configured to display information associated with food recognition and analysis.

FIG. 8 illustrates another example user interface 800 that is configured to present information associated with food recognition and analysis. The images of the user interface 800 as depicted in FIG. 8 represent a progression, from left to right, of changes to the user interface 800 as the user interacts with the user interface 800. The user interface 800 may include the same or similar features as the user interface 600. For example, the user interface 800 may include a header window 802, which may provide a visual indication of the subject matter presented on the user interface 800. The user interface 800 may additional include a recipe indicator 804. The recipe indicator 804 may provide a visual indication that a recipe, or a portion thereof, is being presented on the user interface 800. The recipe may include food item indicators 806, which may represent food items in a list of food items associated with the recipe. The recipe may include quantity indicators 808, which may represent the quantity of the food items in the list of food items associated with the recipe. The quantity indicators may have the same or varying units of measurements.

The device on which the user interface 800 is displayed may be in wired and/or wireless communication with a device, such as device 300 from FIG. 3, that is configured to recognize and quantify food item placed on a weight-measuring scale of the device. The device, and/or a remote system, may send data indicating that one or more food items associated with the recipe have been detected on the weight-measuring scale. A visual and/or audible indication that an ingredient of the recipe has been identified may be provided. In addition, the data may indicate that the quantity of the food item detected on the weight-measuring scale is greater than or less than the quantity associated with the recipe. For example, as shown in FIG. 8, ground beef may be placed on the weight-measuring scale. The device may recognize that the object on the weight-measuring scale is ground beef and may determine that the weight associated with the ground beef indicates that 2 pounds of ground beef are present. This data may be sent to the device presenting the user interface 800. In this example, the amount of ground beef placed on the scale is approximately double the amount called for in the recipe. Based at least in part on this information, the quantity of the other ingredients in the recipe may be modified to account for the modified amount of detected ground beef. For example, the modified recipe may now call for 2 stalks of celery instead of 1 stalk as originally presented. The modified recipe may be presented visually on the device presenting the user interface 800, and/or the modified recipe may be presented audibly, such as via speakers of the device presenting the user interface 800, the device recognizing and quantity the food items, and/or a communal device, such as the voice-assistant device 302 from FIG. 3, for example. The modified recipe may be stored in memory associated with any or all of the devices depicted with respect to FIG. 3.

Figure 9:
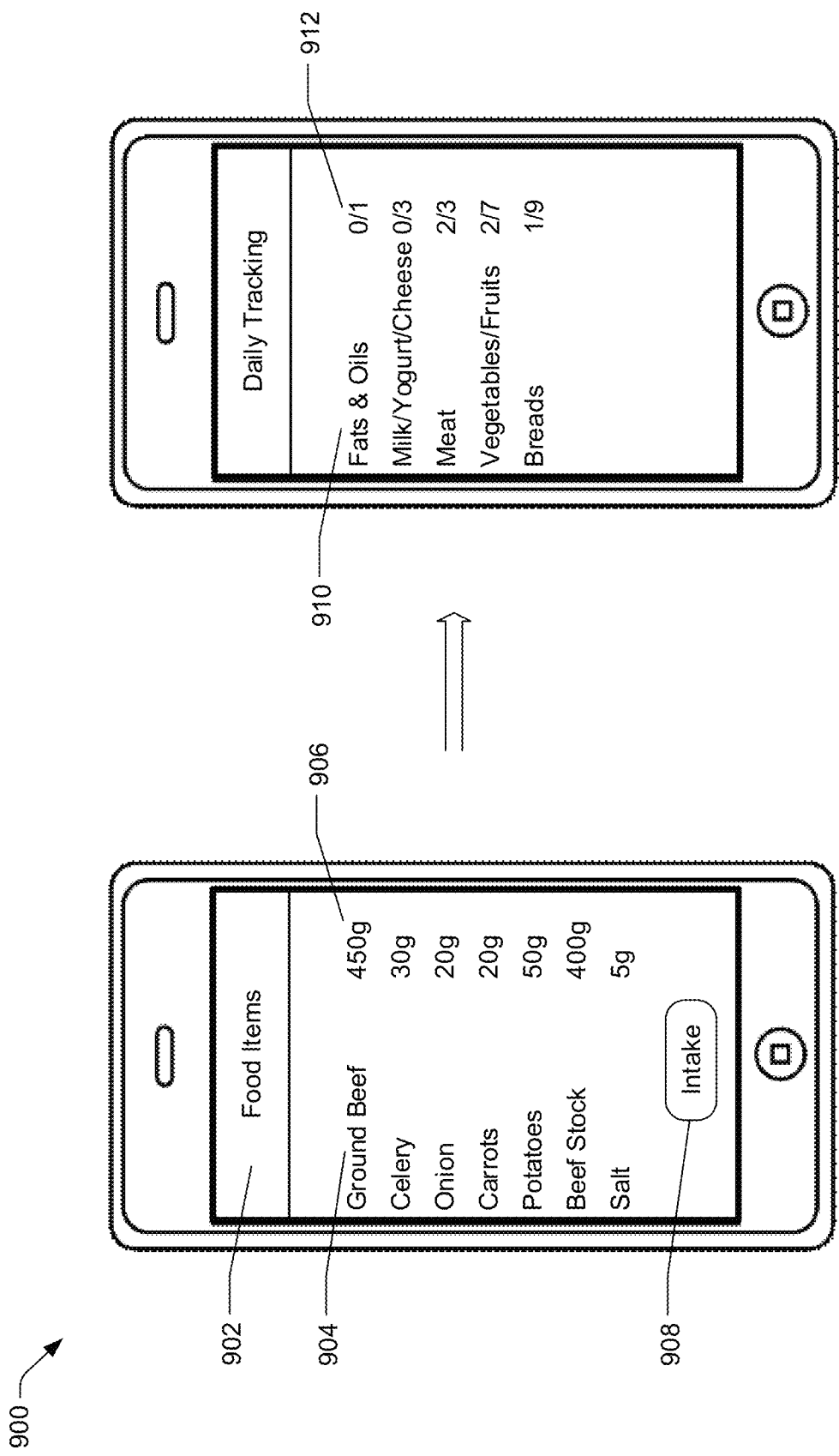
FIG. 9 illustrates another example user interface configured to display information associated with food recognition and analysis.

FIG. 9 illustrates another example user interface 900 configured to present information associated with food recognition and analysis. The images of the user interface 900 as depicted in FIG. 9 represent a progression, from left to right, of changes to the user interface 900 as the user interacts with the user interface 900. The user interface 900 may include the same or similar features as the user interface 400. For example, the user interface 900 may include a header window 902, which may provide a visual indication of the subject matter presented on the user interface 900. The user interface 900 may also include food item indicators 904 and quantity indicators 906. The user interface 900 may also include functionality allowing a user to track and view nutritional intake information over a period of time, such as per meal, per day, per week, per month, etc. This functionality may be provided by way of an Intake indicator 908. It should be appreciated that while the Intake indicator 908 is presented on a selectable portion of a screen, the Intake indicator 908 may also be selected via an audible and/or visual command provided by a user. Upon receiving an indication that the Intake indicator 908 has been selected, the user interface 900 may display nutritional information associated with food intake over a given period of time.

For example, as illustrated in FIG. 9, multiple food items have been detected via the food recognition and quantification device, as described herein. Upon selection of the Intake indicator 908, the user interface 900 may present macronutrient information associated with the detected food items. In the example provided in FIG. 9, the period of time is depicted on a per-day basis. However, the period of time may be per meal, per week, per month, etc. The specificity of the macronutrient information may vary and may be user configurable. In the example of FIG. 9, the macronutrient information has been presented as food groups 910 along with an indication of the recommended servings 912 of those food groups 910. The recommended servings 912 may be altered based on dietary information and/or user-related data, and/or the recommended servings by be user-configurable. While food groups are presented in the example of FIG. 9, it should be understood that other macronutrient and/or micronutrient information may be presented instead of, or in addition to, the food group information.

Figure 10:
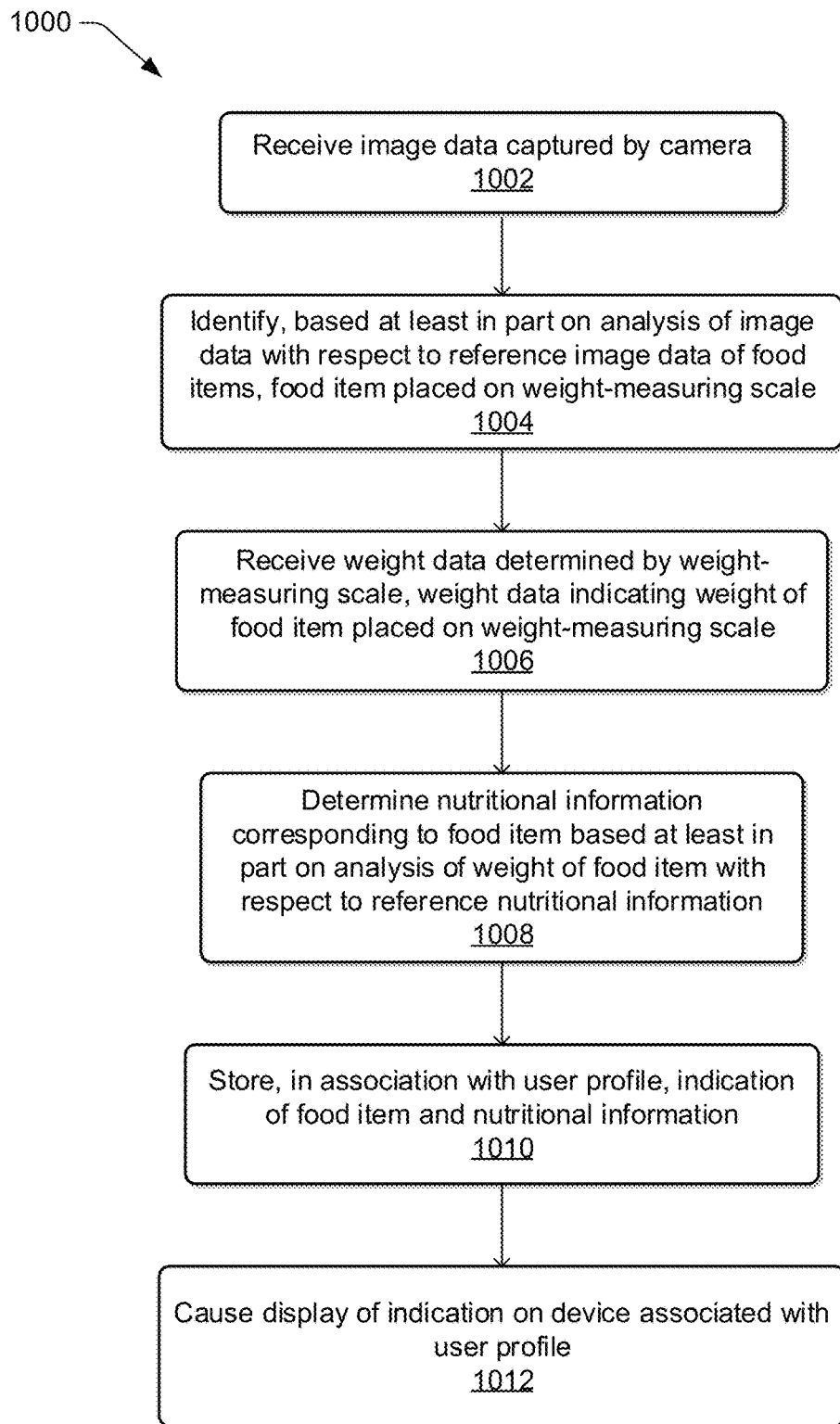
FIG. 10 illustrates a flow diagram of an example process for food recognition and analysis.

FIG. 10 illustrates a flow diagram of an example process 1000 for food recognition and analysis. The order in which the operations or steps are described is not intended to be construed as a limitation, and any number of the described operations may be combined in any order and/or in parallel to implement process 1000.

At block 1002, process 1000 may include receiving image data captured by one or more cameras. The one or more cameras may be components of a first device, which may also include a weight-measuring scale, or the one or more cameras may be separate from a device including the weight-measuring scale. For example, the cameras may be a component of a mobile device, such as a personal mobile phone. An application may be stored on memory of the device and the application may provide functionality that allows a user of the device to capture images of a food item with the camera of the device. The device, through the application or other means, may be paired or otherwise associated with the weight-measuring scale. This pairing may allow for image data generated by the camera of the device to be synced or otherwise associated with weight data determined by the weight-measuring scale. The cameras may capture one or more images of an object placed on the device. By way of example, the cameras may initiate the capturing of the one or more images based at least in part on a signal from a weight-measuring scale. The signal may indicate that an object has been detected on the surface of the weight-measuring scale. Additionally, or alternatively, the cameras may initiate capturing one or more images based at least in part on a user command received via one or more microphones and/or an input received via a display, such as a touchscreen.

Both or just one of the cameras may capture images. The number of images captured may vary based at least in part on the frames per second (fps) at which the cameras operate or are configured to operate as well as the number of seconds during which the cameras are configured to capture images. In examples, the cameras may be set to an initial frames-per-second rate and an initial capture time. The frames-per-second rate and/or the capture time may be dynamic and may adjust based on data relating to previous use of the cameras indicating a minimum fps and capture time that is likely to produce accurate food item recognition above a threshold confidence level.

The cameras may capture one or more images as described herein and image data corresponding to the images may be generated. The image data may be stored locally on device and/or the image data may be transmitted to a remote system, such as another device associated with the environment of the user, a voice-assistant device for example, and/or to a system remote from the environment of the user. The images captured by the cameras may correspond to visible light reflected from a surface of the object on the weight-measuring scale. Additionally, or alternatively, the image data may correspond to light outside the visible light spectrum, such as, for example, infrared light reflected from a surface or other portion of the object on the weight-measuring scale. When the cameras are components of the same device as the weight-measuring scale, the cameras may be disposed at locations that provide differing viewpoints with respect to the object on the weight-measuring scale. Additionally, or alternatively, the cameras may be stationary with respect to the weight-measuring scale or the cameras may move. For example, the cameras may rotate about the weight-measuring scale, may move horizontally with respect to the surface of the weight-measuring scale, may move vertically with respect to the surface of the weight-measuring scale, and/or may move closer to and/or farther from the surface of the weight-measuring scale. Additionally, or alternatively, the cameras may be configured to adjust zoom parameters, pan parameters, and/or tilt parameters. These parameters may be adjusted manually, such as by a user of the device, and/or via instructions provided to the cameras from one or more processors. Additionally, the parameters may be adjusted via physical changes to the cameras and/or digital changes to the image data generated by the cameras.

In examples where more than one camera is utilized, image data corresponding to an image from a first camera may be stitched together or otherwise associated with an image from the second camera to generate a full or partial three-dimensional model of the object on the weight-measuring scale. Additionally, or alternatively, the one or more cameras may be a component of the weight-measuring scale and may be positioned to point outward from the surface of the weight-measuring scale. In these examples, the weight-measuring scale may be transparent or substantially transparent to allow light reflected off the object to be captured by the one or more cameras.

Additionally, or alternatively, in instances where multiple cameras are utilized, all of the cameras may capture images of the object or only a portion of the multiple cameras may capture images of the object. In examples, one or a portion of the cameras may be utilized to capture images. If analysis of first image data corresponding to the images provides for identification of the object at a high confidence level, the remaining cameras may not be utilized. However, if the object is not identified or is identified at below a threshold confidence level, one or more of the remaining cameras may initiate capturing images of the object and second image data corresponding to the images may be analyzed separately or in conjunction with the first image data to identify the object. Additionally, or alternatively, use of a portion of the multiple cameras may be based at least in part on a determination of whether the object is occluded or partially occluded from view of one or more of the cameras. The cameras having an occluded view may not be utilized to capture images and/or such cameras may be moved to a position with an un-occluded or less occluded view. A preview or example image or video feed of the object being viewed by the cameras may be displayed, such as, for example, on display.

The image data generated by the cameras as described herein may be transmitted from the device associated with the cameras to a remote system, which may receive the image data via one or more wired or wireless connections.

At block 1004, the process 1000 may include identifying, based at least in part on analysis of the image data with respect to reference image data of food items, a food item placed on the weight-measuring scale. Identifying the food item may include comparing the image data received from the device, or a portion thereof, with reference image data stored in a database. The comparison may include identifying similarities between the image data and reference data. The similarities may include similar colors, shapes of objects depicted in the image and reference data, sizes of objects depicted in the image and reference data, and other image-related characteristics, such as shading, lighting, and object texture. The comparison may result in at least a portion of the reference data being identified as corresponding to or being similar to the image data received from the device. A confidence level may be determined that the selected reference data corresponds to the image data. The confidence level may, but need not be, represented in terms of a percentage similarity between the reference data and the image data.

By way of example, the image data received from the device may correspond to an image including a granny smith apple. The image data may be analyzed with respect to the reference data, which may include image data corresponding to multiple food items, including apples. The analysis may result in a determination that the image data from the device depicts a mostly round, light green, shiny object. This image data may be compared to the reference data, which may result in one or multiple potential food items as matching or corresponding to the image data. For example, the result of the analysis may include a determination that the detected food item could be a lime, a watermelon, a grape, or an apple. Each of these potential matches may be assigned a confidence level, and the match with the highest confidence level may be determined to be the identified food item. In instances where the confidence level of the identified food item is below a threshold confidence level, say, for example, 90% confidence, the food item may be identified as one or multiple potential food items and user input and/or analysis of additional data associated with the food item, such as a recipe, may be utilized to assist in identifying the food item.

At block 1006, the process 1000 may include receiving weight data determined by the weight-measuring scale. The weight data may indicate a weight of the food item placed on the weight-measuring scale. While the word "weight," is used herein, other units of quantification may also be used. For example, volume and/or density may be determined based at least in part on analysis of the mass of an object in conjunction with image data from the cameras. Weight may be provided in one or multiple units of measurement, such as, for example, grams and/or pounds. Additionally, or alternatively, the weight-measuring scale may have one or multiple weighing sections. For example, when the weight-measuring scale has multiple weighing sections, multiple objects may be placed on the weight-measuring scale at the same time and each object may be independently weighed.

The weight-measuring scale may generate data corresponding to a weight of one or more objects placed on a surface of the weight-measuring scale. The data may be stored at device and/or the data may be transmitted to a remote system. Additionally, or alternatively, data corresponding to a time may be generated and may be used to associate the weight data with image data generated by the cameras. In this way, the image data and the weight data may be analyzed in conjunction with each other to identify the object and/or quantify the object. The data indicating the weight may be received from the device via a wired and/or wireless network as described herein.

At block 1008, the process 1000 may include determining nutritional information corresponding to the food item based at least in part on analysis of the weight of the food item with respect to reference nutritional information. The data indicating identification of the food item may be compared to reference data in one or more databases that indicate nutritional information corresponding to food items listed in the databases. Once the detected food item is associated with a reference food item from the databases, analysis of the detected quantity of the food item with respect to the nutritional information stored in the databases is performed. For example, if the identified food item is a granny smith apple, that detected food item is associated with reference data that corresponds to the granny smith apple information from the databases. If the detected quantity of the granny smith apple is, for example, 10 grams, that detected quantity may be compared to a reference quantity of granny smith apple nutritional information from the databases. For example, if the reference quantity is 20 grams and the nutritional information stored in the databases is based on a quantity of 20 grams, then, in the example provided herein, the stored nutritional information may be decreased by half to approximate the nutritional information associated with the 10-gram detected granny smith apple. Based at least in part on the above analysis, nutritional information of the food item may be determined.

At block 1010, the process 1000 may include storing, in association with a user profile, an indication of the food item and the nutritional information. The indication may be stored on the device from which the image data and/or the data indicating weight was sent from, or the indication may be stored on another device, such as a remote system, a personal device, and/or a communal device such as a voice-assistant device. While the stored information is in association with a user profile, the information may also be associated with one or more user accounts, user devices, and/or users.

At block 1012, the process 1000 may include causing presentation, at least one of audibly or visually, of the indication on a device associated with the user profile. For example, causing presenting may include causing display of the indication on the device associated with the user profile. Presentation of the indication may be, for example, on a display associated with the device that the image data and/or the data indicating the weight were received from. Additionally, or alternatively, presentation of the indication may be on a display associated with a device other than the device that the image data and/or the data indicating the weight were received from, such as a personal device, a communal device, or another device having a screen, such as a television. Presentation of the indication may additionally, or alternatively, be audible and may include synthesized or prerecorded speech output by one or more speakers. The speakers may be components of the device that sent the image data and weight data, or the speakers may be components of another device.

The process 1000 may additionally include receiving a second indication that a portion of the food item is apportioned to the user profile and modifying the nutritional information stored in the of the user profile based at least in part on the second indication. The second indication may be a selection of apportionment functionality by a user. In this example, the user may be prompted to provide an estimation of the apportionment of the meal. For example, the user may indicate that the meal is being apportioned between multiple people and the user may indicate approximately how much of the meal is being apportioned to each person. In other examples, the user may provide an indication as to the quantity being apportioned to the user profile, such as, for example, a volume or weight of the quantity being apportioned. The quantity indication may be utilized to determine a portion of the meal that is apportioned to the user profile.

The nutritional information may be adjusted based at least in part on the determined apportionment of the meal. In other examples, the apportionment of a meal may be performed utilizing the weight-measuring scale. For example, once a meal is prepared, a portion of the meal to be apportioned to the user profile may be placed upon the weight-measuring scale and weighed. The weight of the portion may be analyzed with respect to the overall weight of the meal to determine the portion attributable to the user profile. In this example, the weight-measuring scale may be calibrated to account for the vessel that holds the meal. Additionally, or alternatively, image data from the cameras described herein may be utilized to determine the volume of the portion of the meal attributable to the user profile.

The process 1000 may additionally, or alternatively, include obtaining portion size information from a database, which may be the same database or a database from those discussed above with respect to identifying the food item and determining the nutritional information associated with the food item. The process 1000 may include analyzing the nutritional information with respect to the portion size information and causing second data corresponding to a food label to be generated based at least in part on analyzing the nutritional information with respect to the portion size information. The information related to the food label may be generated and/or formatted by analyzing the data corresponding to identification of the food item, the data corresponding to the quantity of the food items, and data corresponding to serving size information and nutritional information of the food items.

For example, a database may be maintained and/or accessed that includes data indicating the amount of nutrients in food items. The database may also include data indicating the recommended serving size for food items and prepared meals. The serving size and nutritional information may be static or dynamic and may be based at least in part on one or more governmental statutes and/or regulations associated with food. For example, the United States Food and Drug Administration (FDA) may promulgate regulations related to the information that must be provided on a food label. The FDA may also provide a database of the serving size and/or nutritional information. The nutritional information for the food items that were recognized and quantified as described herein may be aggregated to determine the total nutritional information for the food items, which may be presented in terms of serving size.

The food label may include information such as the serving size, the servings per container, macronutrient information, micronutrient information, ingredient information, and explanatory text, for example. The information to be presented on the food label may vary based at least in part on jurisdictional considerations as well as the type of food items that are recognized and quantified. The device storing the data corresponding to the food label may be in wired and/or wireless communication with a printing component and may send data to the printing component instructing the printing component to print the food label.

The process 1000 may additionally, or alternatively, include identifying, based at least in part on at least one of the image data or second image data from the one or more cameras, a second food item placed on the weight-measuring scale and receiving second data representing a second weight of the second food item. The process 1000 may further include generating, at least in part, recipe data representing a recipe associated with the first food item and the second food item. For example, an indication that a recipe should be generated may be received and, based at least in part on that indication, data representing the recipe may be generated. The data may include identification of the food items and/or the quantity of the food items. Additional information, such as directions for the recipe may be included in that data.

Figure 11:
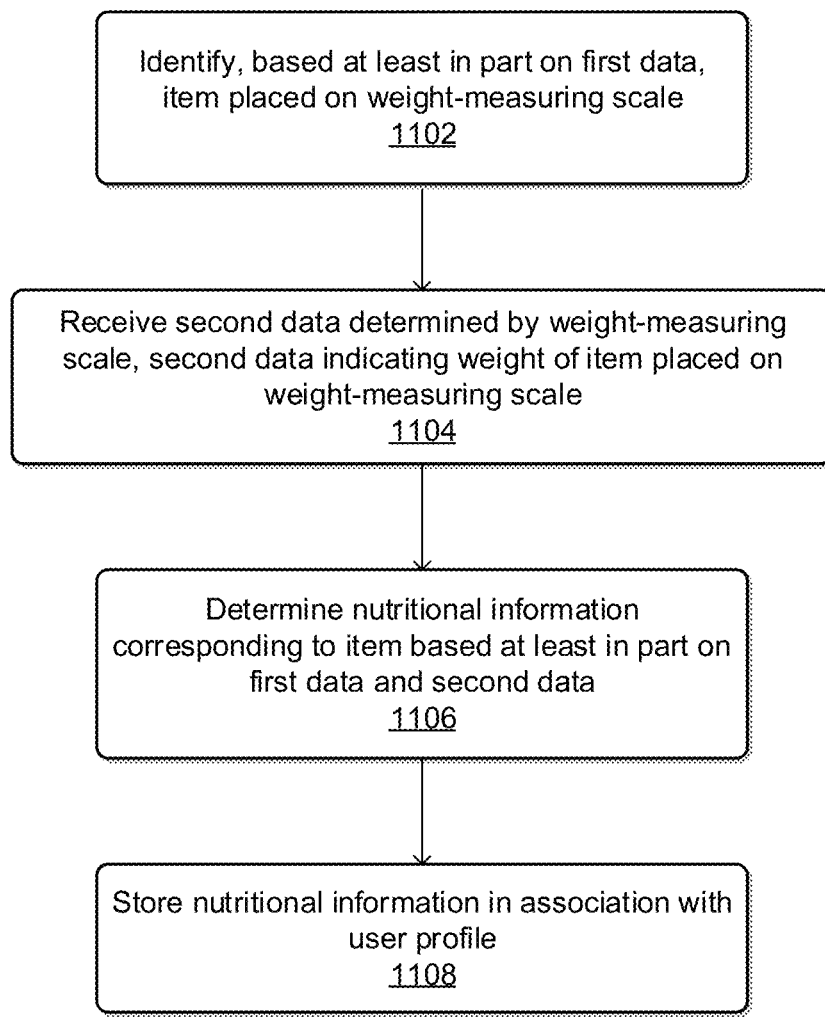
FIG. 11 illustrates a flow diagram of another example process for food recognition and analysis.

FIG. 11 illustrates a flow diagram of an example process 1100 for food recognition and analysis. The order in which the operations or steps are described is not intended to be construed as a limitation, and any number of the described operations may be combined in any order and/or in parallel to implement process 1100.

At block 1102, process 1100 may include identifying, based at least in part on first data, an item placed on a weight-measuring scale. The first data may be received, for example, from a device associated with one or more cameras, a weight-measuring scale, one or more microphones, one or more speakers, and/or a display. The device may additionally, or alternatively, include other components such as, for example, a mass spectrometer, an infrared spectrometer, a barcode scanner, and/or a Quick Response Code (QRC) scanner. The components of the device may generate data that may be utilized to identify and/or quantify one or more items placed on or proximity to the device. For example, the first data may correspond to image data generated by the cameras and may be utilized to identify the item and/or to determine a volume of the item. The volume of the item may be analyzed with respect to a reference volume associated with the item and determining the nutritional information may be based at least in part on analyzing the detected volume with respect to reference nutritional information associated with the reference volume.

Additionally, or alternatively, the microphones may generate audio data corresponding to user speech identifying the item. Additionally, or alternatively, the mass spectrometer and/or infrared spectrometer may generate spectrography data corresponding to the food item, which may be analyzed with respect to known spectrography data to identify the food item. Additionally, or alternatively, the barcode scanner may be utilized to detect a barcode situated proximate to the device. For example, a barcode may be provided as a portion of packaging associated with an item. Once scanned, the barcode may be analyzed with respect to known barcodes to identify the object. Additionally, or alternatively, the QRC scanner may be utilized to detect a QRC situated proximate to the device. For example, a QRC may be provided as a portion of packing associated with an object. Once scanned, QRC may be analyzed with respect to known QRCs to identify the object. Additionally, or alternatively, data representing a recipe and/or list of items may be provided to and/or stored on the device. The objects associated with the recipe and/or list of items may be utilized, such as in conjunction with the other data described herein, to identify the item and or to quantify the item. For example, an indication that the item is associated with a recipe may be received. The indication may be based at least in part on a user command indicating that the item is associated with a recipe, for example. Ingredients associated with the recipe may be identified and identifying the item may be based at least in part on selecting the item from the ingredients.

When the first data corresponds to image data, identifying the item may include comparing the image data received from a camera with reference image data stored in a database. The comparison may include identifying similarities between the image data and reference data. The similarities may include similar colors, shapes of objects depicted in the image and reference data, sizes of objects depicted in the image and reference data, and other image-related characteristics, such as shading, lighting, and object texture. The comparison may result in at least a portion of the reference data being identified as corresponding to the image data received from the device. A confidence level may be determined that the selected reference data corresponds to the image data. The confidence level may, but need not be, represented in terms of a percentage similarity between the reference data and the image data.

By way of example, the image data received from the device may correspond to an image including a granny smith apple. The image data may be analyzed with respect to the reference data, which may include image data corresponding to multiple items, including apples. The analysis may result in a determination that the image data from the device depicts a mostly round, light green, shiny object. This image data may be compared to the reference data, which may result in one or multiple potential items as matching or corresponding to the image data. For example, the result of the analysis may include a determination that the detected item could be a lime, a watermelon, a grape, or an apple. Each of these potential matches may be assigned a confidence level, and the match with the highest confidence level may be determined to be the identified item. In instances where the confidence level of the identified item is below a threshold confidence level, say, for example, 90% confidence, the item may be identified as one or multiple potential items and user input and/or analysis of additional data associated with the item, such as a recipe, may be utilized to assist in identifying the item.

At block 1104, the process 1100 may include receiving second data determined by the weight-measuring scale, the second data indicating a weight of the item. While the word "weight," is used herein, other units of quantification may also be used. For example, volume and/or density may be determined based at least in part on analysis of the mass of an object in conjunction with image data from the cameras. Weight may be provided in one or multiple units of measurement, such as, for example, grams and/or pounds. Additionally, or alternatively, the weight-measuring scale may have one or multiple weighing sections. For example, when the weight-measuring scale has multiple weighing sections, multiple objects may be placed on the weight-measuring scale at the same time and each object may be independently weighed. When the density is determined, analysis of the density with respect to a reference density associated with the food item may be performed and determining the nutritional information, described below, may be based at least in part on analyzing the detected density with respect to reference nutritional information associated with the reference density.

The weight-measuring scale may generate data corresponding to a weight of one or more objects placed on a surface of the weight-measuring scale. The data may be stored at the device associated with the weight-measuring scale and/or the data may be transmitted to a remote system. Additionally, or alternatively, data corresponding to a time may be generated and may be used to associate the weight data with image data generated by the cameras. In this way, the image data and the weight data may be analyzed in conjunction with each other to identify the object and/or quantify the object. The data indicating the weight may be received from the device via a wired and/or wireless network as described herein.

At block 1106, the process 1100 may include determining nutritional information corresponding to the item based at least in part on the first data and the second data. The data indicating identification of the item may be compared to reference data in one or more databases that indicate nutritional information corresponding to items listed in the databases. Once the detected item is associated with a reference item from the databases, analysis of the detected quantity of the item with respect to the nutritional information stored in the databases is performed. For example, if the identified item is a granny smith apple, that detected item is associated with reference data that corresponds to the granny smith apple information from the databases. If the detected quantity of the granny smith apple is, for example, 10 grams, that detected quantity may be compared to a reference quantity of granny smith apple nutritional information from the databases. For example, if the reference quantity is 20 grams and the nutritional information stored in the databases is based on a quantity of 20 grams, then, in the example provided herein, the stored nutritional information may be decreased by half to approximate the nutritional information associated with the 10-gram detected granny smith apple. Based at least in part on the above analysis, nutritional information of the item may be determined.

At block 1108, the process 1100 may additionally include storing the nutritional information in association with the user profile. The nutritional information may be stored on the device from which the image data and/or the data indicating weight was sent from, or the nutritional information may be stored on another device, such as a remote system, a personal device, and/or a communal device such as a voice-assistant device. While the stored information is in association with a user profile, the information may also be associated with one or more user accounts, user devices, and/or users.

The process 1100 may additionally, or alternatively, include receiving an indication that the item is associated with a recipe and determining that a quantity of at least a second item associated with the recipe should be adjusted based at least in part on the weight of the first item. The device on which the item was placed, and/or the remote system, may send data indicating that one or more items associated with the recipe have been detected on the weight-measuring scale. In addition, the data may indicate that the quantity of the item detected on the weight-measuring scale is greater than or less than the quantity associated with the recipe. Based at least in part on this information, an indication of the quantity of the other ingredients in the recipe may be modified to account for the modified amount of the first item. The modified recipe may be presented visually on a device, and/or the modified recipe may be presented audibly, such as via speakers of the device or another device. The modified recipe may be stored in memory associated with any or all of the devices depicted with respect to FIG. 3, for example.

The process 1100 may additionally, or alternatively, include receiving an indication that a portion of the item is apportioned to a user profile and modifying the nutritional information stored with respect to the user profile based at least in part on the indication. The indication may be a selection of apportionment functionality by a user. In this example, the user may be prompted to provide an estimation of the apportionment of the meal. For example, the user may indicate that the meal is being apportioned between multiple people and the user may indicate approximately how much of the meal is being apportioned to each person. In other examples, the user may provide an indication as to the quantity being apportioned to the user profile, such as, for example, a volume or weight of the quantity being apportioned. The quantity indication may be utilized to determine a portion of the meal that is apportioned to the user profile.

The nutritional information may be adjusted based at least in part on the determined apportionment of the meal.

In other examples, the apportionment of a meal may be performed utilizing the weight-measuring scale. For example, once a meal is prepared, a portion of the meal to be apportioned to the user profile may be placed upon the weight-measuring scale and weighed. The weight of the portion may be analyzed with respect to the overall weight of the meal to determine the portion attributable to the user profile. In this example, the weight-measuring scale may be calibrated to account for the vessel that holds the meal, such as a plate. Additionally, or alternatively, image data from the cameras described herein may be utilized to determine the volume of the portion of the meal attributable to the user profile.

Figure 12:
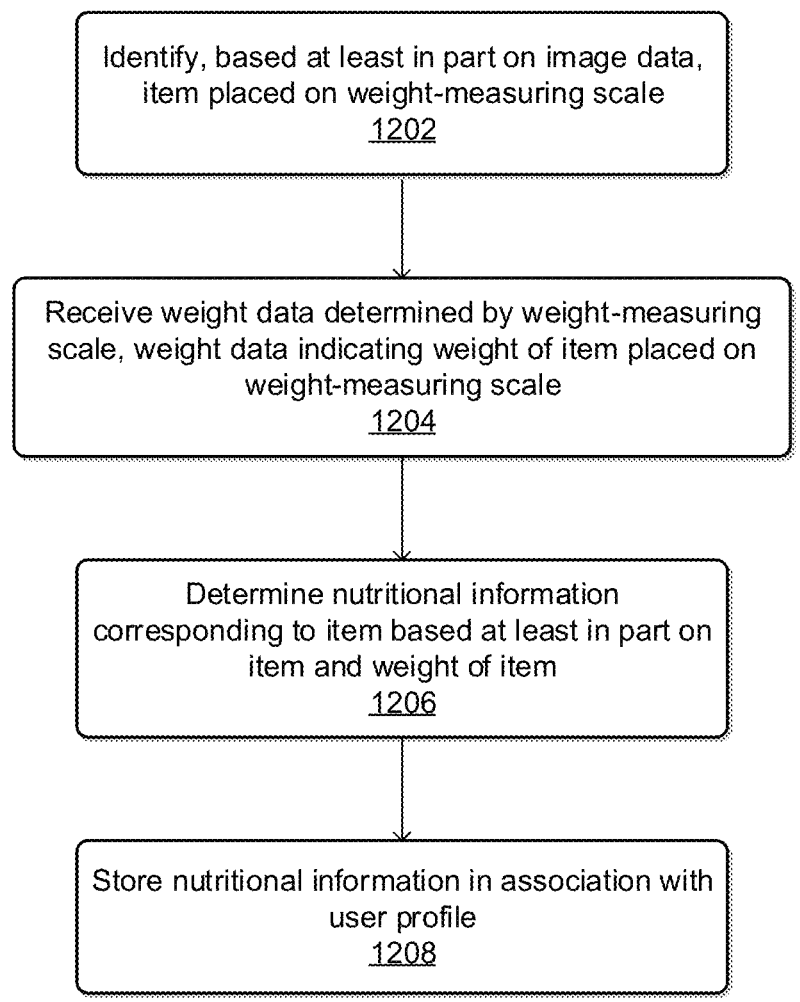
FIG. 12 illustrates a flow diagram of another example process for food recognition and analysis.

FIG. 12 illustrates a flow diagram of an example process 1200 for food recognition and analysis. The order in which the operations or steps are described is not intended to be construed as a limitation, and any number of the described operations may be combined in any order and/or in parallel to implement process 1200.

At block 1202, process 1200 may include identifying, based at least in part on image data, an item placed on a weight-measuring scale. Identifying the item may include comparing the image data with reference image data stored in a database. The comparison may include identifying similarities between the image data and reference data. The similarities may include similar colors, shapes of objects depicted in the image and reference data, sizes of objects depicted in the image and reference data, and other image-related characteristics, such as shading, lighting, and object texture. The comparison may result in at least a portion of the reference data being identified as corresponding to the image data. A confidence level may be determined that the selected reference data corresponds to the image data. The confidence level may, but need not be, represented in terms of a percentage similarity between the reference data and the image data.

By way of example, the image data may correspond to an image including a granny smith apple. The image data may be analyzed with respect to the reference data, which may include image data corresponding to multiple food items, including apples. The analysis may result in a determination that the image data depicts a mostly round, light green, shiny object. This image data may be compared to the reference data, which may result in one or multiple potential items as matching or corresponding to the image data. For example, the result of the analysis may include a determination that the detected item could be a lime, a watermelon, a grape, or an apple. Each of these potential matches may be assigned a confidence level, and the match with the highest confidence level may be determined to be the identified item. In instances where the confidence level of the identified item is below a threshold confidence level, say, for example, 90% confidence, the item may be identified as one of multiple potential items and user input and/or analysis of additional data associated with the item, such as a recipe, may be utilized to assist in identifying the item.

Additionally, or alternatively, the process 1200 may include receiving, from a device having one or more microphones, audio data corresponding to user speech identifying the item. The process 1200 may include determining, based at least in part on analysis of the audio data, such as via automatic speech recognition and/or natural language understanding techniques, that the user speech includes an indication related to identification of the item. In this example, identifying the item may be based at least in part on the indication from the user speech. Additionally, or alternatively, a mass spectrometer and/or infrared spectrometer may generate spectrography data corresponding to the item, which may be analyzed with respect to known spectrography data to identify the item. Additionally, or alternatively, a barcode scanner may be utilized to detect a barcode situated proximate to the device. For example, a barcode may be provided as a portion of packaging associated with a food item. Once scanned, the barcode may be analyzed with respect to known barcodes to identify the object. Additionally, or alternatively, a QRC scanner may be utilized to detect a QRC situated proximate to the device. For example, a QRC may be provided as a portion of packing associated with an object. Once scanned, QRC may be analyzed with respect to known QRCs to identify the object. Additionally, or alternatively, data representing a recipe and/or list of items may be provided to and/or stored on the device. The objects associated with the recipe and/or list of items may be utilized, such as in conjunction with the other data described herein, to identify the item and or to quantify the item. For example, an indication that the item is associated with a recipe may be received. The indication may be based at least in part on a user command indicating that the item is associated with a recipe, for example. Ingredients associated with the recipe may be identified and identifying the item may be based at least in part on selecting the item from the ingredients.

At block 1204, the process 1200 may include receiving weight data determined by the weight-measuring scale, the weight data indicating a weight of the item placed on the weight-measuring scale. The weight-measuring scale may be configured to weigh an object placed on the weight-measuring scale. The weight-measuring scale may correspond to its own device and/or may correspond to at least one of a cooktop, a countertop, a cooking surface, or a cutting board. While the word "weight," is used herein, other units of quantification may also be used. For example, volume and/or density may be determined based at least in part on analysis of the mass of an object in conjunction with image data from the cameras. Weight may be provided in one or multiple units of measurement, such as, for example, grams and/or pounds. Additionally, or alternatively, the weight-measuring scale may have one or multiple weighing sections. For example, when the weight-measuring scale has multiple weighing sections, multiple objects may be placed on the weight-measuring scale at the same time and each object may be independently weighed.

The weight-measuring scale may generate data corresponding to a weight of one or more objects placed on a surface of the weight-measuring scale. The data may be stored at device and/or the data may be transmitted to a remote system. Additionally, or alternatively, data corresponding to a time may be generated and may be used to associate the weight data with image data generated by the cameras. In this way, the image data and the weight data may be analyzed in conjunction with each other to identify the object and/or quantify the object. The data indicating the weight may be received from the device via a wired and/or wireless network as described herein.

At block 1206, the process 1200 may include determining nutritional information corresponding to the item based at least in part on the item and the weight of the item. The data indicating identification of the item may be compared to reference data in one or more databases that indicate nutritional information corresponding to items listed in the databases. Once the detected item is associated with a reference item from the databases, analysis of the detected quantity of the item with respect to the nutritional information stored in the databases is performed. For example, if the identified item is a granny smith apple, that detected item is associated with reference data that corresponds to the granny smith apple information from the databases. If the detected quantity of the granny smith apple is, for example, 10 grams, that detected quantity may be compared to a reference quantity of granny smith apple nutritional information from the databases. For example, if the reference quantity is 20 grams and the nutritional information stored in the databases is based on a quantity of 20 grams, then, in the example provided herein, the stored nutritional information may be decreased by half to approximate the nutritional information associated with the 10-gram detected granny smith apple. Based at least in part on the above analysis, nutritional information of the item may be determined. The nutritional information may include the information described herein, including but not limited to macronutrient information and/or micronutrient information.

At block 1208, the process 1200 may include storing the nutritional information in association with the user profile. The nutritional information may be stored on the device from which the image data and/or the data indicating weight was sent from, or the nutritional information may be stored on another device, such as a remote system, a personal device, and/or a communal device such as a voice-assistant device. While the stored information is in association with a user profile, the information may also be associated with one or more user accounts, user devices, and/or users.

The process 1200 may additionally, or alternatively, include determining, based at least in part on the image data, that the item is a fruit and determining a ripeness level of the fruit. Determining that the item is a fruit may be performed utilizing the image data analysis described with respect to block 1202. Determining a ripeness level of the fruit may be performed by analyzing color data associated with the image data with respect to reference data for the identified fruit. For example, the item may be identified as a banana. The color of the banana, as represented in the image data, may be compared to the color of reference data associated with bananas of varying ripeness levels. For example, first reference data for an unripe banana may include color data indicating that the banana is green or a shade of green, second reference data for a ripe banana may include color data indicating that the banana is yellow or a shade of yellow, and/or third reference data for an overripe banana may include color data indicating that the banana is brown or a shade of brown. The nutritional information may be based at least in part on the ripeness level.

The process 1200 may additionally, or alternatively, include displaying the nutritional information on a screen associated with the weight-measuring scale. Additionally, or alternatively, the process 1200 may include causing output of audio corresponding to the nutritional information via an audio speaker associated with the weight-measuring scale.

Figure 13:
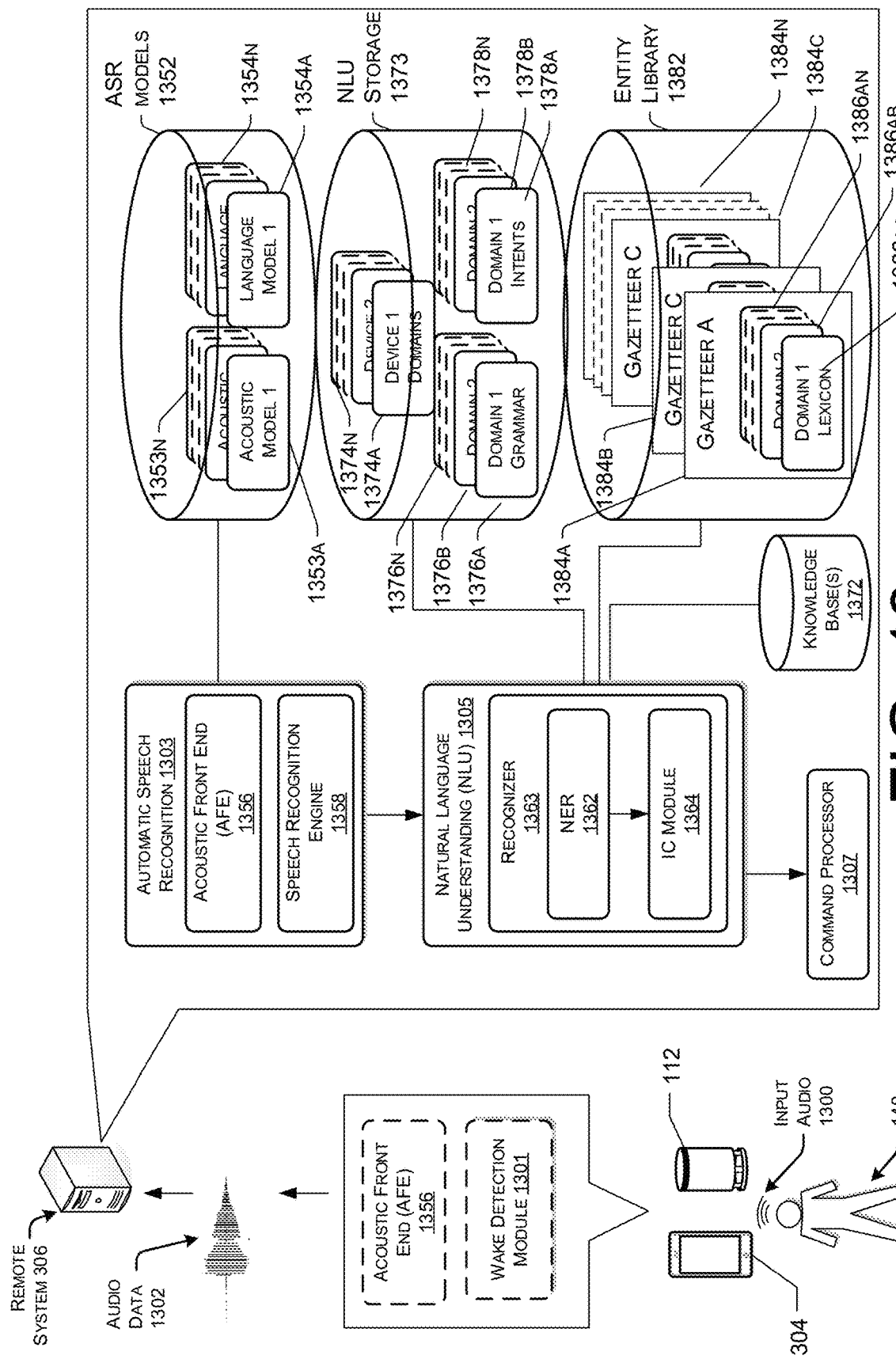
FIG. 13 illustrates a conceptual diagram of components of a speech processing system for processing audio data provided by one or more devices.

FIG. 13 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 306). The various components illustrated may be located on a same or different physical devices. Communication between various components illustrated in FIG. 13 may occur directly or across a network 308. An audio capture component, such as a microphone 136 of the device 112, or another device, captures audio 1300 corresponding to a spoken utterance. The device 112, using a wakeword detection module 1301, then processes audio data corresponding to the audio 1300 to determine if a keyword (such as a wakeword) is detected in the audio data. Following detection of a wakeword, the device sends audio data 1302 corresponding to the utterance to the remote system 126 that includes an ASR module 1303. The audio data 1302 may be output from an optional acoustic front end (AFE) 1356 located on the device prior to transmission. In other instances, the audio data 1302 may be in a different form for processing by a remote AFE 1356, such as the AFE 1356 located with the ASR module 1303 of the remote system 306.

The wakeword detection module 1301 works in conjunction with other components of the user device, for example a microphone to detect keywords in audio 1300. For example, the device may convert audio 1300 into audio data, and process the audio data with the wakeword detection module 1301 to determine whether speech is detected, and if so, if the audio data comprising speech matches an audio signature and/or model corresponding to a particular keyword.

The user device may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by user device (or separately from speech detection), the user device may use the wakeword detection module 1301 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1301 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 112 may "wake" and begin transmitting audio data 1302 corresponding to input audio 1300 to the remote system 306 for speech processing. Audio data corresponding to that audio may be sent to remote system 306 for routing to a recipient device or may be sent to the remote system 306 for speech processing for interpretation of the included speech (either for purposes of enabling voice-communications and/or for purposes of executing a command in the speech). The audio data 1302 may include data corresponding to the wakeword, or the portion of the audio data corresponding to the wakeword may be removed by the local device 112 prior to sending. Further, a local device may "wake" upon detection of speech/spoken audio above a threshold, as described herein. Upon receipt by the remote system 306, an ASR module 1303 may convert the audio data 1302 into text. The ASR transcribes audio data into text data representing the words of the speech contained in the audio data 1302. The text data may then be used by other components for various purposes, such as executing system commands, inputting data, etc. A spoken utterance in the audio data is input to a processor configured to perform ASR which then interprets the utterance based on the similarity between the utterance and pre-established language models 1354 stored in an ASR model knowledge base (ASR Models Storage 1352). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1353 stored in an ASR Models Storage 1352), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 1303 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1356 and a speech recognition engine 1358. The acoustic front end (AFE) 1356 transforms the audio data from the microphone into data for processing by the speech recognition engine 1358. The speech recognition engine 1358 compares the speech recognition data with acoustic models 1353, language models 1354, and other data models and information for recognizing the speech conveyed in the audio data. The AFE 1356 may reduce noise in the audio data and divide the digitized audio data into frames representing a time intervals for which the AFE 1356 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1358 may process the output from the AFE 1356 with reference to information stored in speech/model storage (1352). Alternatively, post front-end processed data (such as feature vectors) may be received by the device executing ASR processing from another source besides the internal AFE. For example, the user device may process audio data into feature vectors (for example using an on-device AFE 1356) and transmit that information to a server across a network for ASR processing. Feature vectors may arrive at the remote system 1326 encoded, in which case they may be decoded prior to processing by the processor executing the speech recognition engine 1358.

The speech recognition engine 1358 attempts to match received feature vectors to language phonemes and words as known in the stored acoustic models 1353 and language models 1354. The speech recognition engine 1358 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 1358 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1358 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 306, for natural language understanding (NLU) processing, such as conversion of the text into commands for execution, either by the user device, by the remote system 306, or by another device (such as a server running a specific application like a search engine, etc.).

The device performing NLU processing 1305 (e.g., server 306) may include various components, including potentially dedicated processor(s), memory, storage, etc. As shown in FIG. 13, an NLU component 1305 may include a recognizer 1363 that includes a named entity recognition (NER) module 1362 which is used to identify portions of query text that correspond to a named entity that may be recognizable by the system. A downstream process called named entity resolution links a text portion to a specific entity known to the system. To perform named entity resolution, the system may utilize gazetteer information (1384a-1384n) stored in entity library storage 1382. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

Generally, the NLU process takes textual input (such as processed from ASR 1303 based on the utterance input audio 1300) and attempts to make a semantic interpretation of the text. That is, the NLU process determines the meaning behind the text based on the individual words and then implements that meaning. NLU processing 1305 interprets a text string to derive an intent or a desired action from the user as well as the pertinent pieces of information in the text that allow a device (e.g., device 112) to complete that action. For example, if a spoken utterance is processed using ASR 1303 and outputs the text "apple on the scale . . . " the NLU process may determine that the user intended to inform a device with a weight-measuring scale that the object placed on the scale is an apple.

The NLU may process several textual inputs related to the same utterance. For example, if the ASR 1303 outputs N text segments (as part of an N-best list), the NLU may process all N outputs to obtain NLU results.

As will be discussed further below, the NLU process may be configured to parse and tag to annotate text as part of NLU processing. For example, for the text "identify this item as an apple," "identify this item" may be tagged as a command (to associate the item on a scale with a type of object) and "as an apple" may be tagged as a specific food item identification to associate with the item on the scale.

To correctly perform NLU processing of speech input, an NLU process 1305 may be configured to determine a "domain" of the utterance, such as "food" or "sports" so as to determine and narrow down which services offered by the endpoint device (e.g., remote system 306 or the user device) may be relevant. For example, determining that the domain is "food" may assist in identifying an object placed on a scale by limiting the possible items to food items.

The named entity recognition (NER) module 1362 receives a query in the form of ASR results and attempts to identify relevant grammars and lexical information that may be used to construe meaning. To do so, the NLU module 1305 may begin by identifying potential domains that may relate to the received query. The NLU storage 1373 includes a database of devices (1374a-1374n) identifying domains associated with specific devices. For example, the user device may be associated with domains for food, sports, office supplies, etc. In addition, the entity library may include database entries about specific services on a specific device, either indexed by Device ID, User ID, or Household ID, or some other indicator.

In NLU processing, a domain may represent a discrete set of activities having a common theme, such as "cooking," "shopping," "music," "calendaring," etc. As such, each domain may be associated with a particular recognizer 1363, language model and/or grammar database (1376a-1376n), a particular set of intents/actions (1378a-1378n), and a particular personalized lexicon (1386). Each gazetteer (1384a-1384n) may include domain-indexed lexical information associated with a particular user and/or device. For example, the Gazetteer A (1384a) includes domain-index lexical information 1386aa to 1386an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both communications and, for example, music, the query may, substantially in parallel, be NLU processed using the grammar models and lexical information for communications, and will be processed using the grammar models and lexical information for music. The responses based on the query produced by each set of models is scored, with the overall highest ranked result from all applied domains is ordinarily selected to be the correct result.

An intent classification (IC) module 1364 parses the query to determine an intent or intents for each identified domain, where the intent corresponds to the action to be performed that is responsive to the query. Each domain is associated with a database (1378a-1378n) of words linked to intents. For example, a music intent database may link words and phrases such as "quiet," "volume off;" and "mute" to a "mute" intent. A voice-message intent database, meanwhile, may link words and phrases such as "send a message," "send a voice message," "send the following," or the like. The IC module 1364 identifies potential intents for each identified domain by comparing words in the query to the words and phrases in the intents database 1378. In some instances, the determination of an intent by the IC module 1364 is performed using a set of rules or templates that are processed against the incoming text to identify a matching intent.

In order to generate a particular interpreted response, the NER 1362 applies the grammar models and lexical information associated with the respective domain to actually recognize a mention one or more entities in the text of the query. In this manner, the NER 1362 identifies "slots" (i.e., particular words in query text) that may be needed for later command processing. Depending on the complexity of the NER 1362, it may also label each slot with a type of varying levels of specificity (such as noun, place, city, artist name, song name, or the like). Each grammar model 1376 includes the names of entities (i.e., nouns) commonly found in speech about the particular domain (i.e., generic terms), whereas the lexical information 1386 from the gazetteer 1384 is personalized to the user(s) and/or the device. For instance, a grammar model associated with the shopping domain may include a database of words commonly used when people discuss shopping.

The intents identified by the IC module 1364 are linked to domain-specific grammar frameworks (included in 1376) with "slots" or "fields" to be filled. Each slot/field corresponds to a portion of the query text that the system believes corresponds to an entity. To make resolution more flexible, these frameworks would ordinarily not be structured as sentences, but rather based on associating slots with grammatical tags. For example, if "send a message" is an identified intent, a grammar (1376) framework or frameworks may correspond to sentence structures such as "Send a message to {contact}," "Send a voice message to {contact}," "Send the following to {contact}," etc.

For example, the NER module 1362 may parse the query to identify words as subject, object, verb, preposition, etc., based on grammar rules and/or models, prior to recognizing named entities. The identified verb may be used by the IC module 1364 to identify intent, which is then used by the NER module 1362 to identify frameworks. A framework for the intent of "send a message," meanwhile, may specify a list of slots/fields applicable to play the identified "contact" and any object modifier (e.g., specifying a device of the recipient) or the like. The NER module 1362 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1362 may search the database of generic words associated with the domain (in the knowledge base 1372). So, for instance, if the query was "send message to Joe," after failing to determine a last name for "Joe," the NER component 1362 may search the domain vocabulary for the word "Joe." In the alternative, generic words may be checked before the gazetteer information, or both may be tried, potentially producing two different results.

The output data from the NLU processing (which may include tagged text, commands, etc.) may then be sent to a command processor 1307. The destination command processor 1307 may be determined based on the NLU output. For example, if the NLU output includes a command to send a message, the destination command processor 1307 may be a message sending application, such as one located on the user device or in a message sending appliance, configured to execute a message sending command. If the NLU output includes a search request, the destination command processor 1307 may include a search engine processor, such as one located on a search server, configured to execute a search command.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 1305 during runtime operations where NLU operations are performed on text (such as text output from an ASR component 1303). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1363. Each recognizer may include various NLU components such as an NER component 1362, IC module 1364 and other components such as an entity resolver, or other components.

For example, a messaging domain recognizer 1363-A (Domain A) may have an NER component 1362-A that identifies what slots (i.e., portions of input text) may correspond to particular words relevant to that domain. The words may correspond to entities such as (for the messaging domain) a recipient. An NER component 1362 may use a machine learning model, such as a domain specific conditional random field (CRF) to both identify the portions corresponding to an entity as well as identify what type of entity corresponds to the text portion. The messaging domain recognizer 1363-A may also have its own intent classification (IC) component 1364-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 306 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 306, as illustrated herein are exemplary, and may be located in a stand-alone device or may be included, in whole or in part, as a component of a larger device or system, may be distributed across a network or multiple devices connected by a network, etc.

Figure 14:
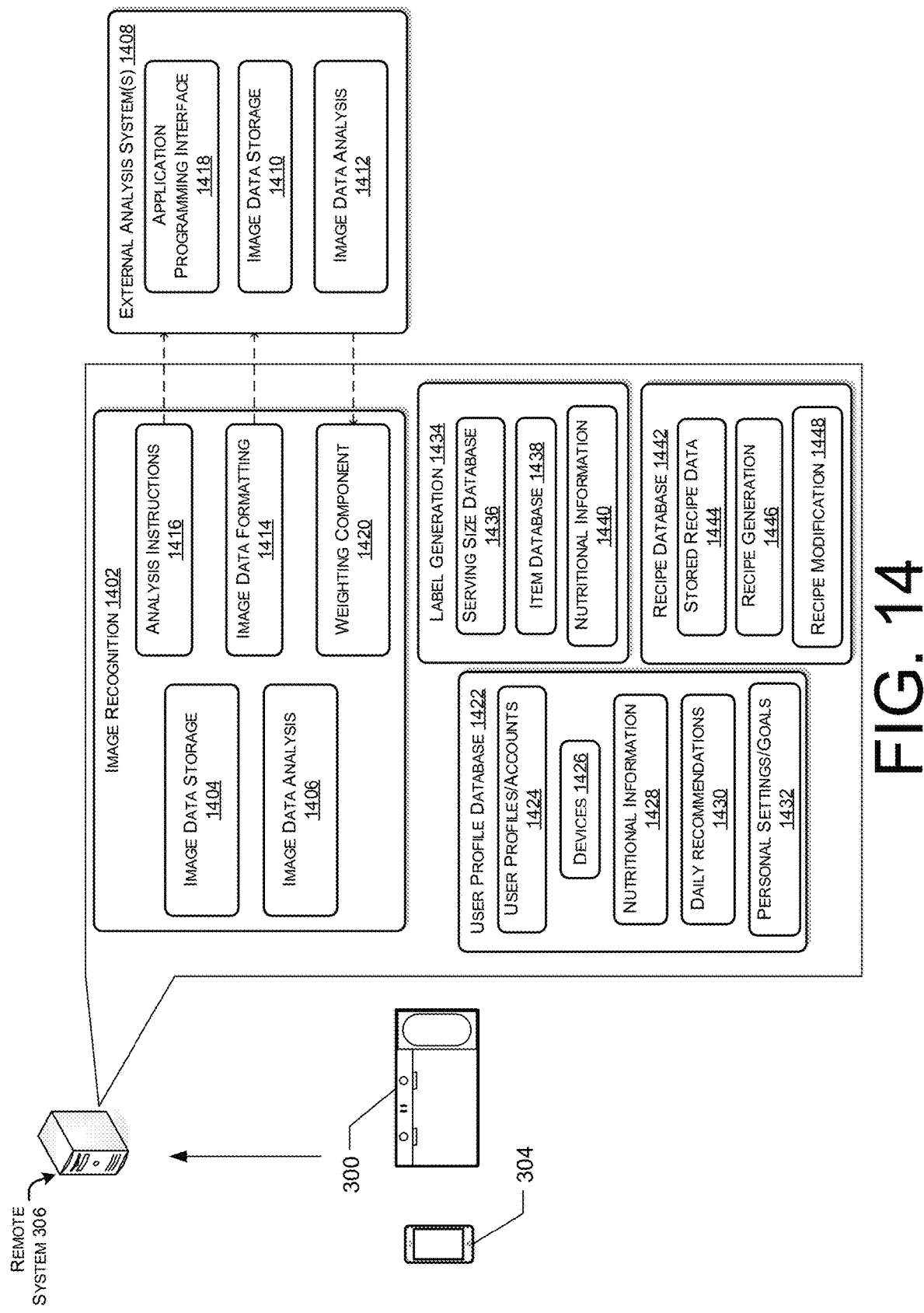
FIG. 14 illustrates a conceptual diagram of components of an item recognition system.

FIG. 14 illustrates a conceptual diagram of components of an item recognition system that utilizes image data to recognize an item. The item recognition system may receive image data from one or more devices, such as, for example, device 300 and/or mobile device 304. The device 300 may include one or more cameras that may capture images and may generate image data corresponding to the images. Additionally, or alternatively, one or more cameras may be situated within an environment associated with the device 300 and those cameras may capture images and generate image data. The mobile device 304 may additionally, or alternatively, capture images and generate image data. Additional details on the capturing of images and generation of image data by the device 300 and/or the mobile device 304 can be found with respect to FIGS. 2 and 3, above.

The image data may be sent from the device 300 and/or the mobile device 304 to a remote system 306. The remote system 306 may include one or more components that may assist in the recognition of an item, such as an item placed on the device 300. For example, the remote system may include an image recognition component 1402. The image recognition component 1402 may include one or more components, such as an image data storage component 1404. The image data storage 1404 may include a library of image data corresponding to items that have been previously identified. The image data stored in the library may be categorized based on item domains, such as, for example, a food domain, a sports domain, a household domain, etc. Within each item domain, image data corresponding to one or more items may be stored and designated. Using the food domain as an example, image data corresponding to food items may be stored, and image data associated with a particular food item may be designated as corresponding to that food item. For example, image data corresponding to an image of a banana may be stored in the food domain of the image data storage 1404 and that image data may be designated as corresponding to a banana. Aspects of the image data, such as the color, shape, texture, shininess, brightness, contrast, etc. of the depicted item may be tagged or otherwise designated as corresponding to the item depicted in the image. The image data storage 1404 may be updated, such as when image data corresponding to an item that has not previously been designated as corresponding to that item is received. The designation may be made by a user, such as through a visual, audible, and/or tactile command, and/or the designation may be based on a comparison of the image data to external image data databases.

The image recognition component 1402 may also include an image data analysis component 1406. The image data analysis component 1406 may utilize the image data received from, for example, the device 300 and/or the mobile device 304, in conjunction with image data stored in the image data storage 1404 to provide an indication of identification of the item placed on, for example, the device 300. The image data analysis component 1406 may compare aspects of the received image data with aspects of the stored image data to determine which stored image data most likely corresponds to the received image data. For example, the analysis may reveal that the received image data is similar in one or more respects to stored image data corresponding to items such as a lime, a watermelon, a grape, or an apple. In this example, the image data analysis component 1406 may determine that a color of the item depicted in the received image data is a shade of green, for example, and a similar shade of green is associated with stored image data associated with a lime, a watermelon, a grape, and an apple. Each of the potentially matching stored image data may be assigned a confidence level, and the match with the highest confidence level may be determined to be the identified item. In instances where the confidence level of the identified item is below a threshold confidence level, say, for example, 90% confidence, the item may be identified as one or multiple potential items and user input and/or analysis of additional data associated with the item, such as a recipe, may be utilized to assist in identifying the item.

In addition to the image data analysis component 1406 of the remote system 306, one or more external analysis systems 1408 may be utilized to recognize an item from the received image data. These external analysis systems 1408 may include their own image data storage components 1410 and image data analysis components 1412. The external analysis systems may be configured to analyze image data from one or many item domains. For example, a particular external analysis system 1408 may be configured to analyze image data for a food domain, while another external analysis system 1408 may be configured to analyze image data for a sports domain. When utilizing external analysis systems 1408, the image recognition component 1402 of the remote system 306 may determine which external analysis system(s) 1408 to utilize for item recognition. For example, the image recognition component 1402 may determine that an environment associated with the device 300 corresponds to a particular domain or set of domains and that a particular external analysis system 1408 or set of systems 1408 correspond to that domain or set of domains. The image data received by the remote system 306 may be sent to the external analysis system(s) 1408. In examples, an image data formatting component 1414 may format the image data according to specifications of the external analysis system(s) 1408. This formatting may include, for example, reformatting the file type associated with the image data and reformatting the size of the image associated with image data. In other examples, image formatting is not needed, and in these examples the image data may be sent to the external analysis system(s) 1408 in the same or substantially the same form as received by the device 300 and/or the mobile device 304.

Along with the image data, in examples, an analysis instructions component 1416 of the image recognition component 1402 may generate and send one or more instructions to the external analysis system(s) 1408. The instructions may include, for example, processes to be performed by the external analysis system(s) 1408 and/or data that may be utilized by the external analysis system(s) 1408 to more accurately recognize the item in question. For example, if the device 300 is situated in a kitchen, the item domain associated with the image data may be designated as a food domain. This information may be provided by the analysis instructions component 1416 to the external analysis system(s) 1408 to facilitate the recognition of the item.

When external analysis system(s) 1408 are utilized in item recognition, one or more application programming interfaces (APIs) 1418 may be utilized. It should be understood that while API 1418 is shown in FIG. 14 to be a component of the external analysis system(s) 1408, the API 1418, or a portion thereof, may additionally or alternatively be a component of the remote system 306 and/or another system or service. The API 1418 may allow a developer associated with the remote system 306 to utilize the resources of the external analysis system(s) 1408 through one or more subroutines, protocols, and tools, for example.

Result data from the image data analysis component 1412 of the external analysis system(s) 1408 may be sent to the remote system 306. A weighting component 1420 may utilize the result data, along with, in some examples, the data from the image data analysis component 1406 of the remote system 306 to identify the item associated with the image data. For example, one or more factors may be utilized to determine a weight or significance of result data from the one or more external analysis system(s) 1408. Example factors may include the confidence level associated with the result data, historical accuracy of data returned by external analysis system(s) 1408, and/or item domains associated with the external analysis system(s) 1408. Additional factors such as timing related to receiving the result data, entities related to the external analysis system(s), aspects associated with the image data such as camera angle, and preset biases may be utilized. The weighting component 1420 may utilize some or all of these factors, among others, to weight the result data from the external analysis system(s) 1408 and/or the image data analysis component 1406 of the remote system 300. The result of this result data weighting may be identification of the item depicted along with a confidence level associated with the identification.

The remote system 306 may additionally include a user profile database 1422. The user profile database 1422 may store data corresponding to one or more user profiles and/or user accounts 1424, which may be associated with the device 300 and/or the mobile device 304 and/or other devices such as a voice-assistant device. Additionally, or alternatively, data corresponding to one or more device 1426 may be stored in the user profile database 1422. An association between the user profiles and/or accounts 1242 and the devices 1426 may also be stored. This information may be utilized by the remote system 306 in relation to item recognition and quantification, as described more fully above. For example, nutritional information 1428 associated with recognized items may be stored in the user profile database 1422 and may be associated with the user profiles and/or accounts 1424 and/or the devices 1426. For example, the nutritional information 1428 may include identification of recognized items, quantities of those items, and/or macronutrients and/or micronutrients associated with the items. Daily recommendations 1430, such as food group service suggestions and/or food type or quantity suggestions may be stored in the user profile database 1422 and may be associated with user profiles and/or accounts 1424 and/or devices 1426. Data associated with personal settings and/or goals 1432 may also be stored in the user profile database 1422 and may be associated with the user profiles and/or accounts 1424 and/or devices 1426.

The remote system 306 may additionally include a label generation component 1434. The label generation component may include and/or have access to a serving size database 1436 and an item database 1438. In examples, the serving size database 1436 and the item database 1438 may be components of the same database or may be separate databases. Additionally, or alternatively, the serving size database 1436 and/or the item database 1438 may be components that are local to the remote system 306 or may be separate from the remote system 306 and may be accessible by the remote system 306. For example, the serving size database 1436 and/or the item database 1438 may be a database maintained by a governmental entity or private entity that stores nutritional information for food items. The label generation component 1434 may utilize results of the image recognition component 1402 to identify one or more items to be analyzed for the purpose of generating, for example, a nutritional facts label. The item database 1438 may be queried to determine if the item recognized by the image recognition component 1402 is an item for which data is stored in the item database 1438. If the recognized item corresponds to an item identified in the item database 1438, the serving size database 1436 may be utilized to determine a recommended serving size associated with the item. For example, if the recognized item is a bunch of grapes, a recommended serving size may be 10 grapes. In addition to the serving size information from the serving size database 1436, nutritional information may be received from the nutritional information component 1440. The item identified in the item database 1438 and the serving size information from the serving size database 1436 may be utilized by the nutritional information component to determine nutrients associated with the recognized item(s). The serving size and nutritional information may be static or dynamic and may be based at least in part on one or more governmental statutes and/or regulations associated with food. The nutritional information for the items that were recognized and quantified as described herein may be aggregated to determine the total nutritional information for the items, which may be presented in terms of serving size. Additionally, the number of portions of the item may be determined based at least in part on analyzing the serving size information with respect to the weight of the items.

The label generation component 1434 may utilize the information described herein to generate data representing a label, such as that shown in FIG. 7, for example. The label may include information such as the serving size, the servings per container, macronutrient information, micronutrient information, ingredient information, and explanatory text, for example. The information to be presented on the label may vary based at least in part on jurisdictional considerations as well as the type of food items that are recognized and quantified. The label may be generated and stored by the remote system 306, and/or the data may be sent to a printing component for printing the label.

The remote system 306 may additionally, or alternatively, include a recipe database 1442. The recipe database 1442 may include a stored-recipe data component 1444, which may include data representing one or more recipes that have been stored in the remote system 306 and/or a device associated with the remote system 306. The stored-recipe data component 1444 may be a component of the remote system 306, as depicted in FIG. 14, or the stored-recipe data component 1444 may be remote to the remote system 306 and may be accessible by the remote system 306. The recipe data stored in the stored-recipe data component 1444 may be utilized during, for example, image recognition by the image recognition component 1402. For example, an indication that the item being recognized is associated with a recipe may be provided to the image recognition component 1402. A list of ingredients may be associated with the recipe, and the image recognition component 1402 may limit the possible items to be recognized to those ingredients associated with the recipe.

The recipe database 1442 may additionally, or alternatively, include a recipe generation component 1446. The recipe generation component 1446 may receive information corresponding to identification of one or multiple items from the image recognition component 1402. Item quantity, which may be determined as described herein, may also be received by the recipe generation component 1446. Additionally, one or more instructions and/or directions may be received by the recipe generation component 1446. The recipe generation component 1446 may utilize the item identification information, the item quantity information, and the instructions and/or directions to generate data corresponding to a recipe. The recipe may include, for example, an ingredients list and the directions corresponding to preparation of the ingredients.

The recipe database 1442 may additionally, or alternatively, include a recipe modification component 1448. The recipe modification component 1448 may be configured to receive data indicating that the quantity of an item detected on a weight-measuring scale, such as with respect to the device 300, is greater than or less than the quantity associated with a recipe. For example, the device 300 may recognize that the item on the weight-measuring scale is ground beef and may determine that the weight associated with the ground beef indicates that 2 pounds of ground beef are present. A recipe associated with the ground beef may indicate that only 1 pound of ground beef is needed for the recipe. Based at least in part on this information, the quantity of the other ingredients in the recipe may be modified to account for the modified amount of detected ground beef. The modified recipe may be stored in memory associated with the remote system 306, for example.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
computer-readable media storing computer-executable instructions that, when executed by the one or more processors, cause the one or more processors to perform operations comprising:
receiving, utilizing a network interface, image data captured by a camera of a weight-measuring scale based at least in part on a food item being placed on the weight-measuring scale;
receiving, utilizing the network interface, audio data from a first device having a microphone, the audio data corresponding to a user utterance representing an identification of the food item placed on the weight-measuring scale;
receiving, utilizing the network interface, an indication of a first recipe being utilized in association with the first device;
identifying ingredients associated with the first recipe;
identifying the food item placed on the weight-measuring scale based at least in part on:
the ingredients;
analysis of the image data with respect to reference image data of food items; and
analysis of the audio data;
receiving, utilizing the network interface, weight data generated by the weight-measuring scale, the weight data indicating a weight of the food item placed on the weight-measuring scale;
determining nutritional information corresponding to the food item based at least in part on analysis of the weight of the food item in association with reference nutritional information;
storing, in a database associated with a user profile, nutritional data indicating the food item and the nutritional information; and
causing display of a graphical user interface on at least one of the first device or a second device associated with the user profile, the graphical user interface including the food item and the nutritional information.

2. The system of claim 1, wherein the weight data comprises first weight data, the weight comprises a first weight, the nutritional information comprises first nutritional information, and the operations further comprising:
receiving, utilizing the network interface, an indication that a portion of the food item is apportioned to the user profile;
receiving second weight data determined by the weight-measuring scale, the second weight data representing a second weight of the food item;
determining that the second weight is less than the first weight; and
generating second nutritional information based at least in part on receiving the indication and determining that the second weight is less than the first weight, the second nutritional information based at least in part on the second weight data.

3. The system of claim 1, the operations further comprising:
receiving, utilizing the network interface, portion size information associated with the food item from a database;
receiving, utilizing the network interface and from the database, nutrient data corresponding to the food item based at least in part on the portion size information;
determining a number of portions of the food item based at least in part on analyzing the portion size information and the weight data; and
causing data corresponding to a food label to be generated, the data including an indication of the number of portions of the food item, an indication of the nutrient data, and an indication of a portion size of the food item.

4. The system of claim 1, wherein the food item comprises a first food item, the image data comprises first image data, the weight data comprises first weight data, the weight comprises a first weight, and the operations further comprising:
identifying a second food item placed on the weight-measuring scale based at least in part on at least one of the first image data or second image data captured by the camera;
receiving, utilizing the network interface, second weight data determined by the weight-measuring scale, the second weight data indicating a second weight of the second food item; and
generating recipe data representing a second recipe that includes at least the first food item and the second food item, the recipe data including at least one of an ingredient list or directions corresponding to preparation of the first food item and the second food item.

5. A method comprising:
receiving, utilizing a network interface, an indication that an item placed on a weight-measuring scale is associated with a first recipe;
identifying, utilizing a processor executing instructions stored on computer-readable media, ingredients associated with the first recipe;
identifying, utilizing the processor, the item placed on the weight-measuring scale based at least in part on:
the ingredients; and
first data comprising audio data representing user speech generated by a microphone, the audio data including an identification of the item placed on the weight-measuring scale, and image data generated by a camera of the weight-measuring scale based at least in part on the item being placed on the weight-measuring scale;
receiving, utilizing the network interface, second data from the weight-measuring scale, the second data being generated by the weight-measuring scale and indicating a weight of the item placed on the weight-measuring scale;
generating, utilizing the processor, third data indicating first nutritional information corresponding to the item based at least in part on the first data and the second data; and
storing, utilizing the processor and in a database, the third data in association with a user profile.

6. The method of claim 5, further comprising:
receiving, utilizing the network interface, the image data from a mobile device associated with the user profile, the image data generated by the mobile device; and
wherein generating the third data is based at least in part on associating the image data with the second data.

7. The method of claim 5, further comprising:
receiving, utilizing the network interface, the audio data from a voice-enabled device associated with the user profile, the audio data generated by a microphone of the voice-enabled device.

8. The method of claim 5, further comprising:
receiving, utilizing the network interface, the image data;
determining, based at least in part on the image data, a volume of the item;
analyzing the volume of the item with respect to a reference volume associated with the item; and
wherein generating the third data is based at least in part on analyzing the volume with respect to reference nutritional information associated with the reference volume.

9. The method of claim 5, wherein the item comprises a first item, and further comprising:
receiving, utilizing the network interface, an indication that the first item is associated with a second recipe;
determining that the weight of the first item differs from a reference weight of the first item from the second recipe; and
adjusting an indication of the quantity of at least a second item associated with the second recipe based at least in part on determining that the weight differs from the reference weight.

10. The method of claim 5, further comprising:
determining, based at least in part on the first data, a density of the item;
analyzing the density of the item with respect to a reference density associated with the item; and
wherein generating the third data is based at least in part on analyzing the density with respect to reference nutritional information associated with the reference density.

11. The method of claim 5, wherein the weight comprises a first weight, and the method further comprising:
receiving, utilizing the network interface, an indication that a portion of the item is apportioned to the user profile;
receiving, utilizing the network interface, fourth data determined by the weight-measuring scale, the fourth data representing a second weight of the food item;
determining that the second weight is less than the first weight; and
generating second nutritional information based at least in part on receiving the indication and determining that the second weight is less than the first weight, the second nutritional information based at least in part on the fourth data.

12. A system comprising:
one or more processors; and
computer-readable media storing computer-executable instructions that, when executed by the one or more processors, cause the one or more processors to perform operations comprising:
receiving, utilizing a network interface, an indication that an item placed on a weight-measuring scale is associated with a first recipe;
identifying ingredients associated with the first recipe;

identifying the item placed on the weight-measuring scale based at least in part on:
  the ingredients;
  image data generated by a camera of the weight-measuring scale based at least in part on the item being placed on the weight-measuring scale; and
  audio data generated by a microphone, the audio data corresponding to a user utterance representing an identification of the item placed on the weight-measuring scale;
receiving, utilizing a network interface, weight data determined by the weight-measuring scale, the weight data indicating a weight of the item placed on the weight-measuring scale;
determining nutritional information corresponding to the item based at least in part on the item and the weight of the item; and
storing, in a database, the nutritional information in association with a user profile.

13. The system of claim 12, the operations further comprising:
  determining, based at least in part on the image data, that the item is a fruit;
  determining, based at least in part on the image data, a ripeness level of the fruit; and
  wherein the nutritional information is based at least in part on the ripeness level.

14. The system of claim 12, wherein the weight-measuring scale corresponds to at least one of a cooktop, a countertop, a cooking surface, or a cutting board.

15. The system of claim 12, wherein the nutritional information includes an indication of at least one of macronutrients associated with the item or micronutrients associated with the item.

16. The system of claim 12, the operations further comprising causing display of the nutritional information on a screen associated with the weight-measuring scale.

17. The system of claim 12, the operations further comprising causing output of audio corresponding to the nutritional information via an audio output speaker associated with the weight-measuring scale.

18. The system of claim 12, the operations further comprising:
  generating a graphical user interface configured to present the nutritional information and the item; and
  causing display of the graphical user interface on a screen associated with the weight measuring scale.

19. The method of claim 5, further comprising:
  generating fourth data indicating second nutritional information corresponding to the first recipe based at least in part on the first data, the second data, and the ingredients; and
  storing, in the database, the fourth data in association with the user profile.

20. The system of claim 12, the operations further comprising:
  determining second nutritional information corresponding to the first recipe based at least in part on the item, the weight of the item, and the ingredients; and
  storing, in the database, the second nutritional information in association with the user profile.

* * * * *